United States Patent
Inagaki

(10) Patent No.: US 11,877,051 B2
(45) Date of Patent: Jan. 16, 2024

(54) EYE-GAZE INFORMATION ACQUIRING APPARATUS, IMAGING APPARATUS, EYE-GAZE INFORMATION ACQUIRING METHOD, AND COMPUTER-READABLE STORAGE MEDIUM

(71) Applicant: CANON KABUSHIKI KAISHA, Tokyo (JP)

(72) Inventor: Yu Inagaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 17/727,397

(22) Filed: Apr. 22, 2022

(65) Prior Publication Data

US 2022/0353431 A1 Nov. 3, 2022

(30) Foreign Application Priority Data

Apr. 30, 2021 (JP) ................................. 2021-077440

(51) Int. Cl.
*H04N 23/63* (2023.01)
*G06F 3/01* (2006.01)
*H04N 23/611* (2023.01)
*H04N 23/667* (2023.01)
*H04N 23/67* (2023.01)

(52) U.S. Cl.
CPC .......... *H04N 23/635* (2023.01); *G06F 3/013* (2013.01); *H04N 23/611* (2023.01); *H04N 23/667* (2023.01); *H04N 23/675* (2023.01)

(58) Field of Classification Search
CPC .. H04N 23/635; H04N 23/611; H04N 23/667; H04N 23/675; G06F 3/013
See application file for complete search history.

(56) References Cited

U.S. PATENT DOCUMENTS

| 2015/0022682 | A1 | 1/2015 | Seita | |
|---|---|---|---|---|
| 2016/0098093 | A1* | 4/2016 | Cheon | H04N 21/41265 345/156 |
| 2020/0371664 | A1* | 11/2020 | Krishnakumar | G06F 3/013 |
| 2020/0393898 | A1* | 12/2020 | Ichikawa | G06F 3/0416 |
| 2021/0157400 | A1* | 5/2021 | Funatsu | G06V 40/165 |

FOREIGN PATENT DOCUMENTS

JP 2015-022208 A 2/2015

* cited by examiner

*Primary Examiner* — Timothy J Henn
(74) *Attorney, Agent, or Firm* — Cowan, Liebowitz & Latman, P.C.

(57) ABSTRACT

An eye-gaze information acquiring apparatus comprising at least one memory and at least one processor which function as: a first acquiring unit configured to acquire first eye-gaze information of an observer who observes display unit displaying an image; a pointer display unit configured to display a pointer indicating an eye-gaze position of the observer on the display unit when a display setting is set to on; and a second acquiring unit configured to acquire second eye-gaze information, based on the first eye-gaze information, wherein the second acquiring unit acquires the second eye-gaze information by a different method depending on the display setting of the pointer.

27 Claims, 20 Drawing Sheets

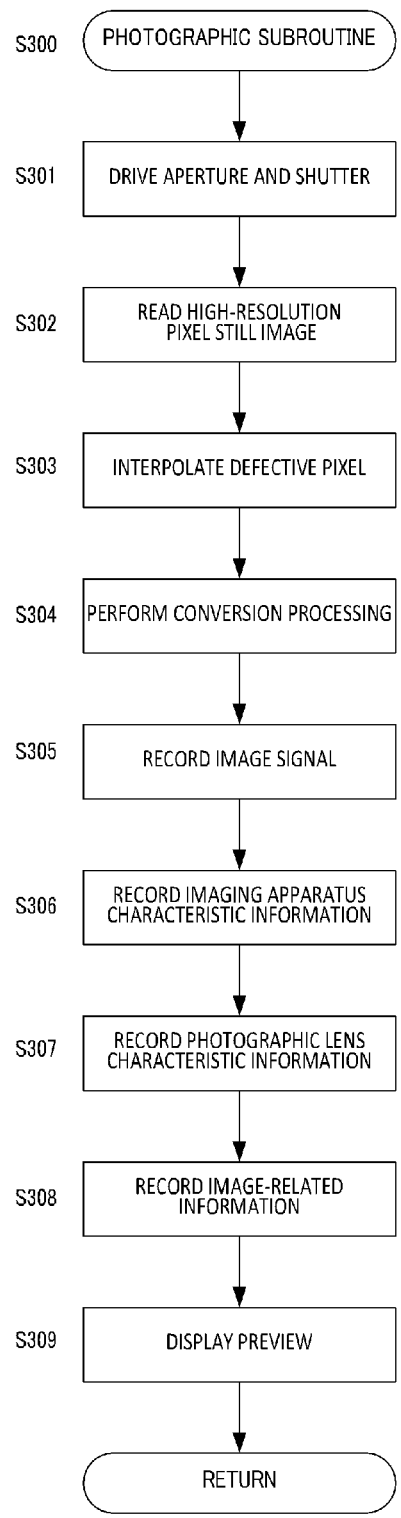

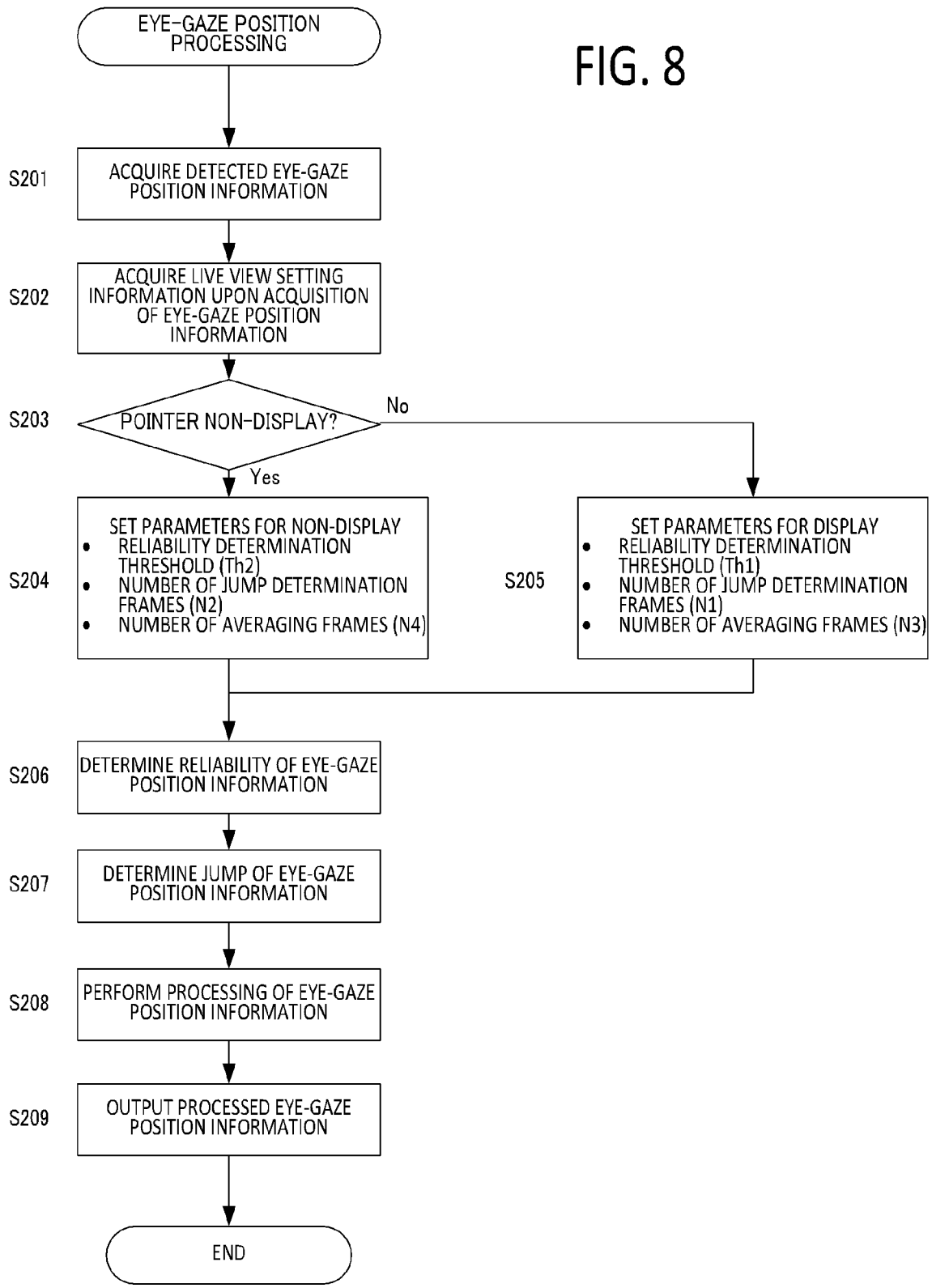

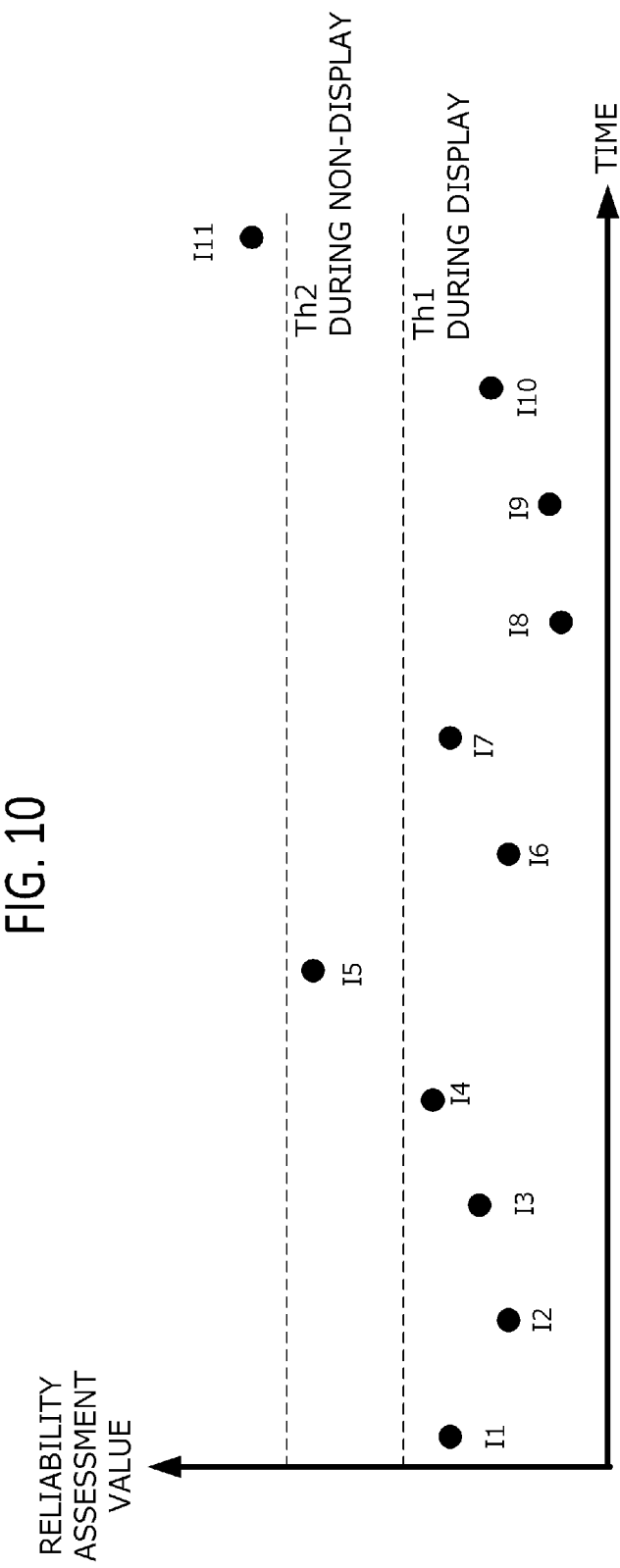

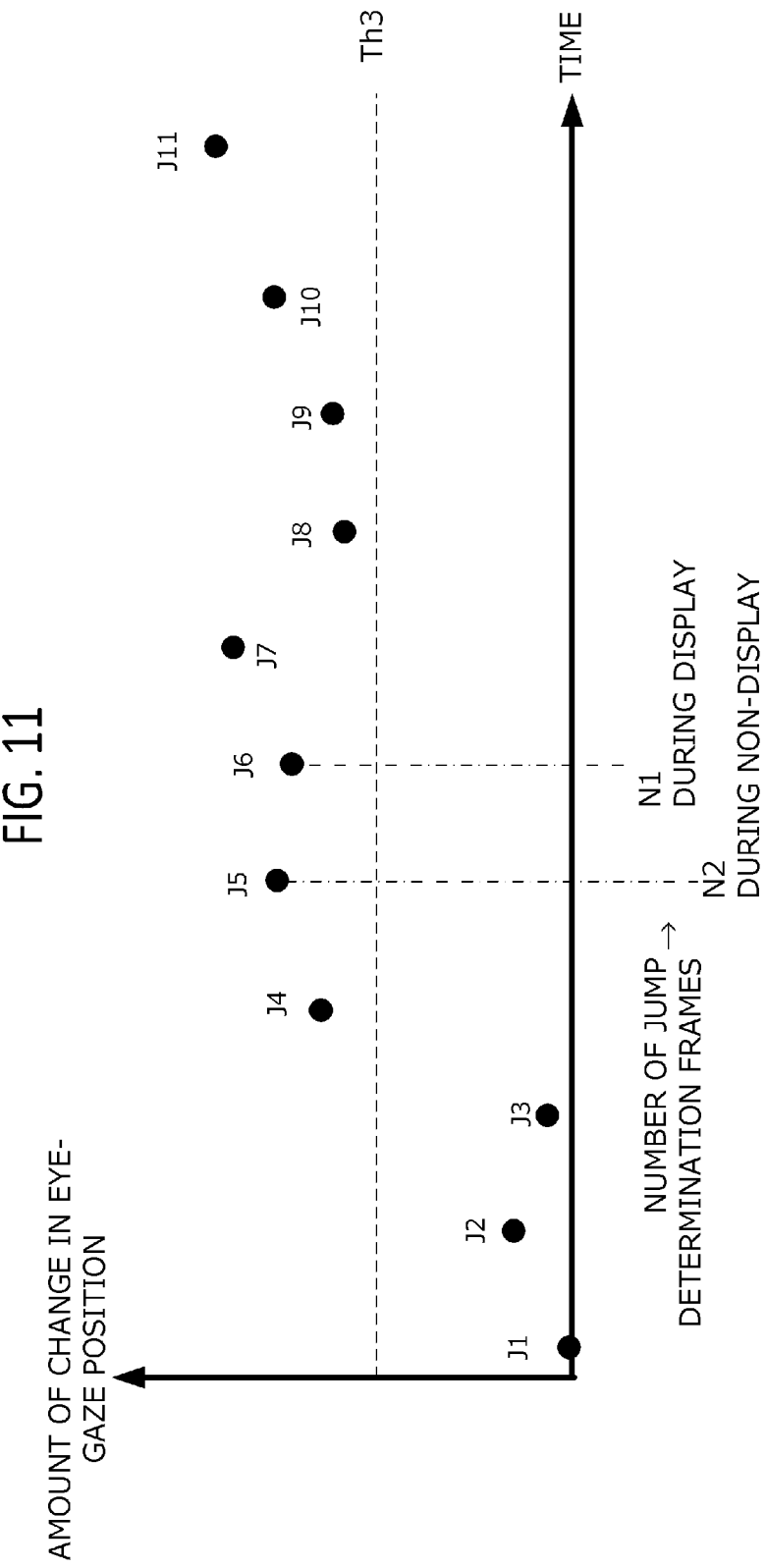

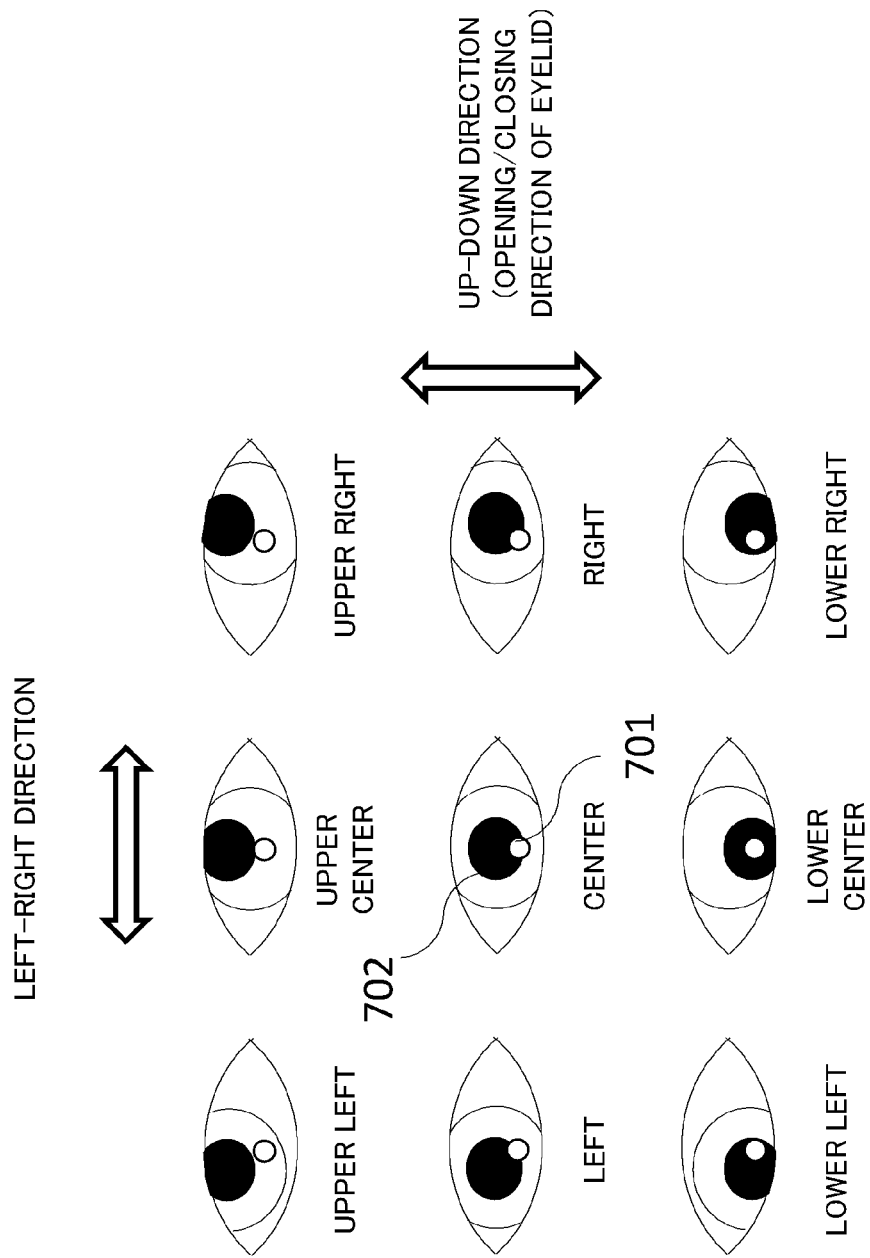

EYE-GAZE INFORMATION ACQUIRING APPARATUS, IMAGING APPARATUS, EYE-GAZE INFORMATION ACQUIRING METHOD, AND COMPUTER-READABLE STORAGE MEDIUM

BACKGROUND OF THE INVENTION

Field of the Invention

The present disclosure relates to an eye-gaze information acquiring apparatus which acquires eye-gaze information of an observer observing a display apparatus.

Description of the Related Art

Japanese Patent Application Laid-open 0 No. 2015-22208 discloses a method of selecting a ranging point by detecting an eye-gaze position of a photographer looking into a finder's field of view. The method involves selecting a ranging point in accordance with a priority of a plurality of ranging point selecting means and enables ranging point selection in accordance with an intention of the photographer to be realized. An imaging apparatus described in Japanese Patent Application Laid-open No. 2015-22208 has a so-called optical finder which forms an optical image on a focus plate.

On the other hand, recently, there is an imaging apparatuses which is not equipped with an optical finder but has an electronic view finder (EVF) as a display apparatus for reproducing video acquired by an imaging element which receives a luminous flux having passed through a photographic optical system. In contrast to an imaging apparatus equipped with an optical finder having luminous flux splitting means, since an imaging apparatus equipped with an electronic view finder does not require luminous flux splitting means, the latter imaging apparatus can perform focus detection and subject detection over a wider area in a photographic range.

A configuration is conceivable in which the eye-gaze position detection technique described in Japanese Patent Application Laid-open No. 2015-22208 is applied to an imaging apparatus equipped with an electronic view finder. In such a configuration, an eye-gaze position from which a moving image is observed can be detected while picking up the moving image. In addition, similarly, a configuration is conceivable in which the eye-gaze position detection technique is applied to VR goggles, a PC, or the like. In such a configuration, an eye-gaze position from which a moving image is observed can be detected while viewing the moving image.

An eye-gaze position of an observer observing a display apparatus may be displayed on the display apparatus by a pointer. In addition, conceivably, displaying or not displaying such a pointer may be made settable. When the pointer is switchable between display and non-display, the following problem occurs.

For example, in an imaging apparatus which has means for detecting an eye-gaze position and which is equipped with an electronic view finder, when the eye-gaze position is displayed by a pointer, a photographer can perform an operation of determining the eye-gaze position after confirming that the pointer has reached a subject. On the other hand, since the eye-gaze position is displayed in real-time, when an eye-gaze position has variability, the pointer vacillates and visibility is low. While moving average processing or the like may be performed using eye-gaze positions obtained during a prescribed period in the past in order to improve visibility, immediacy of pointer display is impaired. On the other hand, in the case of pointer non-display, since the photographer cannot check whether or not the pointer has reached the subject, there is a possibility that an operation of determining an eye-gaze position is performed before the pointer reaches the subject. Therefore, if there is a temporal delay between the position which is actually being viewed and an eye-gaze position used for control, when an observer performs an operation of selecting a viewed position immediately after moving his/her eye-gaze, a failure such as selecting a wrong position occurs. While problems have been explained using an imaging apparatus as an example, similar problems occur in electronic devices in general which detect an eye-gaze position of an observer observing a display apparatus and which exercise control by utilizing the detected eye-gaze position.

SUMMARY OF THE INVENTION

The present disclosure has been made in consideration of such problems and an object thereof is to realize calculation of eye-gaze information which enable a position being observed by an observer to be accurately selected regardless of the presence/absence of a display setting of a pointer.

The first aspect of the present disclosure is an eye-gaze information acquiring apparatus comprising at least one memory and at least one processor which function as: a first acquiring unit configured to acquire first eye-gaze information of an observer who observes display unit displaying an image; a pointer display unit configured to display a pointer indicating an eye-gaze position of the observer on the display unit when a display setting is set to on; and a second acquiring unit configured to acquire second eye-gaze information, based on the first eye-gaze information, wherein the second acquiring unit acquires the second eye-gaze information by a different method depending on the display setting of the pointer.

The second aspect of the present disclosure is an eye-gaze information acquiring apparatus comprising at least one memory and at least one processor which function as: a processing unit configured to display a frame, based on eye-gaze information of an observer observing display unit displaying an image and a determination operation by the observer; and a pointer display unit configured to display a pointer indicating an eye-gaze position of the observer on the display unit when a display setting is set to on, wherein when the observer moves an eye-gaze position from a first position to a second position and performs the determination operation at a timing where the eye-gaze position has moved to the second position, a distance between the frame and the second position when the display setting is off is smaller than a distance between the frame and the second position when the display setting is on.

The third aspect of the present disclosure is an eye-gaze information acquiring apparatus comprising at least one memory and at least one processor which function as: a processing unit configured to display a frame, based on eye-gaze information of an observer observing display unit displaying an image and a determination operation by the observer; and a pointer display unit configured to display a pointer indicating an eye-gaze position of the observer on the display unit when a display setting is set to on, wherein when the observer moves an eye-gaze position from a first position to a second position and performs the determination operation at a timing when a prescribed period of time has elapsed after the eye-gaze position has moved to the second position, the prescribed period of time, which is necessary for a distance between the frame and the second position to become smaller than a prescribed value, is shorter when the display setting is off than when the display setting is on.

The fourth aspect of the present disclosure is an eye-gaze information acquiring apparatus comprising at least one memory and at least one processor which function as: a processing unit configured to select a subject, based on eye-gaze information of an observer observing display unit displaying an image and a determination operation by the observer, and for performing display to that effect; and a pointer display unit configured to display a pointer indicating an eye-gaze position of the observer on the display unit when a display setting is set to on, wherein an amount of positional displacement between the eye-gaze position of the observer and the subject, which is allowed for a subject to be selected, is larger when the display setting is off than when the display setting is on.

The fifth aspect of the present disclosure is an imaging apparatus comprising at least one memory and at least one processor which function as: a setting unit configured to set an operating mode from a plurality of operating modes including a first operating mode and a second operating mode; an imaging unit configured to pick up an image; a display unit configured to display the image; a first acquiring unit configured to acquire first eye-gaze information of an observer observing the display unit; and a second acquiring unit configured to acquire second eye-gaze information, based on the first eye-gaze information, wherein the second acquiring unit acquires the second eye-gaze information using methods that differ from each other between when the set operating mode is the first operating mode and when the set operating mode is the second operating mode.

The sixth aspect of the present disclosure is an eye-gaze information acquiring method performed by an eye-gaze information acquiring apparatus, the method comprising the steps of: acquiring first eye-gaze information of an observer who observes a display unit configured to display an image, displaying a pointer indicating an eye-gaze position of the observer on the display unit when a display setting is set to on; and acquiring second eye-gaze information, based on the first eye-gaze information, wherein in the step of acquiring second eye-gaze information, the second eye-gaze information is acquired by a different method depending on the display setting of the pointer.

The present disclosure is able to realize calculation of eye-gaze information which enable a position being observed by an observer to be accurately selected regardless of the presence/absence of a display setting of a pointer.

Further features of the present invention will become apparent from the following description of exemplary embodiments with reference to the attached drawings.

BRIEF DESCRIPTION OF THE DRAWINGS

FIG. 7 is a flow chart showing details of a photographic subroutine according to the embodiment;

FIG. 8 is a flow chart showing processing of an eye-gaze position according to the embodiment;

FIG. 10 is a diagram for explaining reliability determination of eye-gaze position information according to the embodiment;

FIG. 11 is a diagram for explaining jump determination of eye-gaze position information according to the embodiment:

FIG. 16 is a diagram for explaining a measurement state of an eye at each eye-gaze position;

DESCRIPTION OF THE EMBODIMENTS

Hereinafter, a preferred embodiment of the present disclosure will be described in detail with reference to the accompanying drawings.

Description of Configuration of Imaging Apparatus

Figure 1:
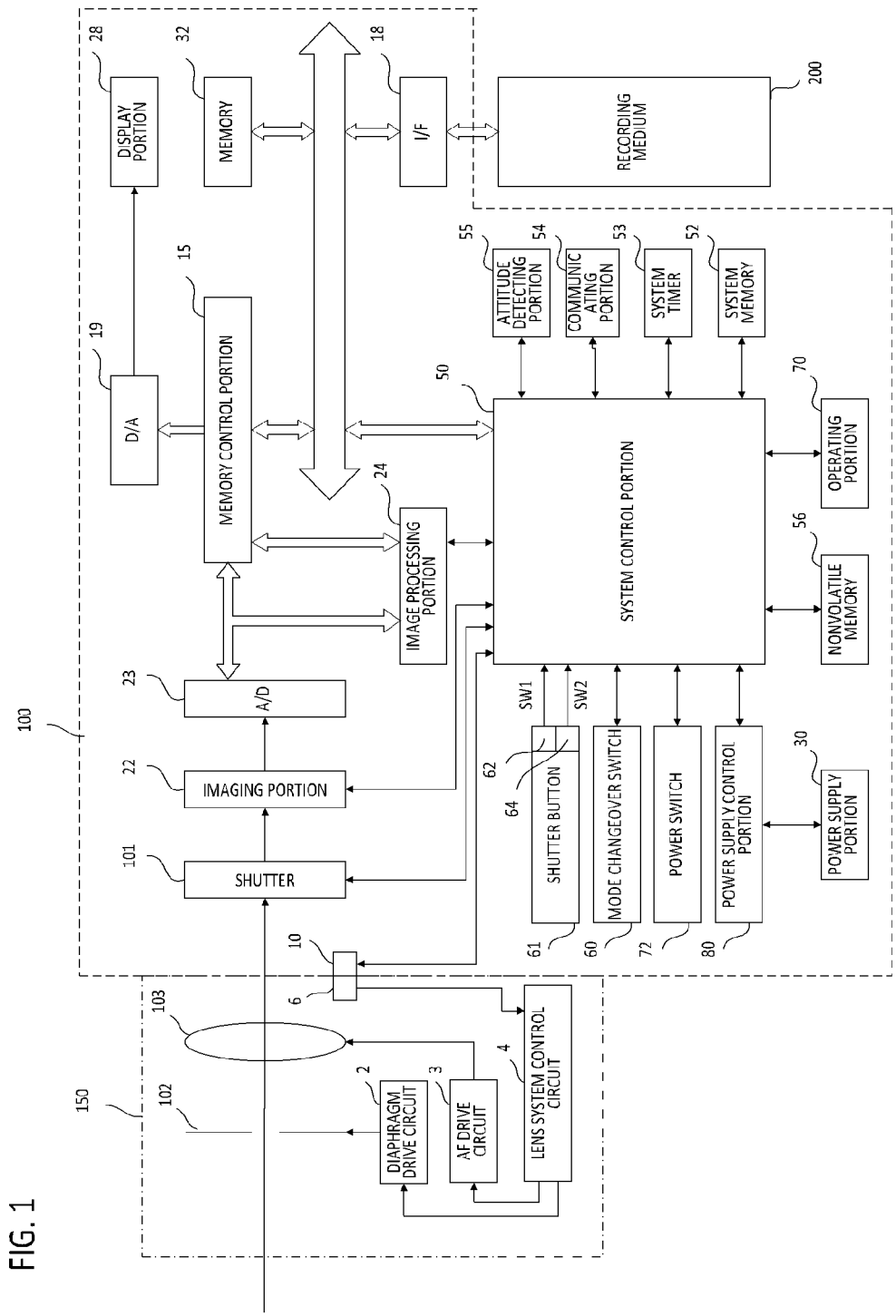
FIG. 1 is a block diagram showing a configuration of an imaging apparatus according to an embodiment.

FIG. 1 is a block diagram showing a configuration of an imaging apparatus including an eye-gaze information acquiring apparatus according to an embodiment. In FIG. 1, a lens unit 150 is a lens unit mounted with a replaceable photographic lens 103. While the photographic lens 103 is usually constituted of a plurality of lenses, in FIG. 1, the photographic lens 103 is shown with only one lens for the sake of simplicity. A communication terminal 6 is a communication terminal used by the lens unit 150 to communicate with a digital camera 100, and a communication terminal 10 is a communication terminal used by the digital camera 100 to communicate with the lens unit 150. The lens unit 150 communicates with a system control portion 50 via the communication terminals 6 and 10, controls a diaphragm 102 using an internal lens system control circuit 4 via a diaphragm drive circuit 2, and performs focusing by displacing a position of the photographic lens 103 via an AF drive circuit 3.

A shutter 101 is a focal plane shutter capable of freely controlling an exposure time of an imaging portion 22 under the control of the system control portion 50. The imaging portion 22 is an imaging element constituted by a device such as a CCD or a CMOS which converts an optical image into an electrical signal. An AD converter 23 converts an analog signal into a digital signal. The A/D converter 23 is used to convert an analog signal output from the imaging portion 22 into a digital signal. A signal obtained from the imaging portion 22 is used not only for imaging but also for exposure control and focus control.

In the imaging portion 22, a pixel of which a photoelectric conversion portion is divided is provided with respect to one microlens. An entrance pupil is divided by dividing the photoelectric conversion portion and a phase difference detection signal can be obtained from each photoelectric conversion portion. In addition, an imaging signal can also be obtained by adding up signals from the divided photoelectric conversion portions. Such a pixel has an advantage in that the pixel can double as a focus detection pixel and an imaging pixel.

Figure 2:
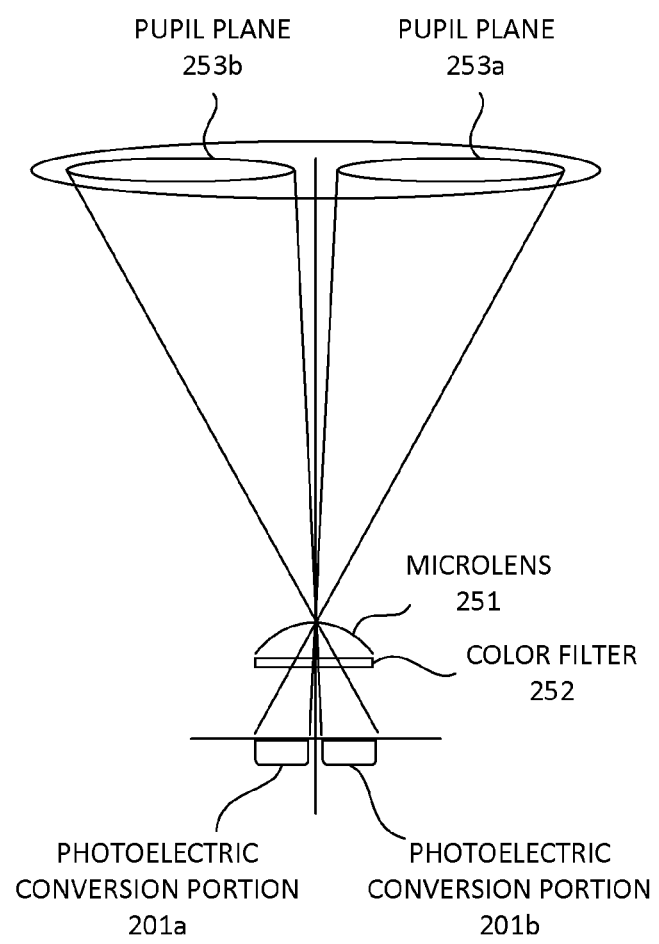
FIG. 2 is a diagram showing a correspondence relationship between a pupil plane and a photoelectric conversion portion of a pixel of the imaging apparatus according to the embodiment.

FIG. 2 is a diagram showing a configuration of a pixel and a correspondence relationship between a pupil plane and a photoelectric conversion portion according to the present embodiment. Reference signs 201a and 201b denote photoelectric conversion portions, 253a and 253b denote pupil planes, 251 denotes a microlens, and 252 denotes a color filter. In FIG. 2, two photoelectric conversion portions, namely, the photoelectric conversion portion 201a (the first focus detection pixel) and the photoelectric conversion portion 201b (the second focus detection pixel) are provided. In the photoelectric conversion portion 201a, light having passed through the pupil plane 253a is incident to the photoelectric conversion portion 201a. In addition, in the photoelectric conversion portion 201b, light having passed through the pupil plane 253b is incident to the photoelectric conversion portion 201b. Accordingly, detection of a focus state (focus detection) can be performed from signals obtained from the photoelectric conversion portion 201a and the photoelectric conversion portion 201b. In addition, an imaging signal can be generated by adding up the signals obtained from the photoelectric conversion portion 201a and the photoelectric conversion portion 201b. While an example in which one pixel has two photoelectric conversion portions has been described, alternatively, one pixel may have a larger number of (for example, four) photoelectric conversion portions.

In the present embodiment, by providing the pixel shown in FIG. 2 over an entire screen region of the imaging portion 22, any subject that appears on the screen can be brought into focus by phase difference detection. While the focus detection system described above will be explained in the present embodiment, focus detection systems are not limited thereto. For example, in another embodiment, focus detection may be performed by providing the imaging portion 22 with a dedicated focus detection pixel shown in FIG. 3 to be described later. Alternatively, without providing the imaging portion 22 with a pixel for focus detection, focus detection may be performed by a contrast system by providing the imaging portion 22 with only a pixel for imaging.

Figure 3:
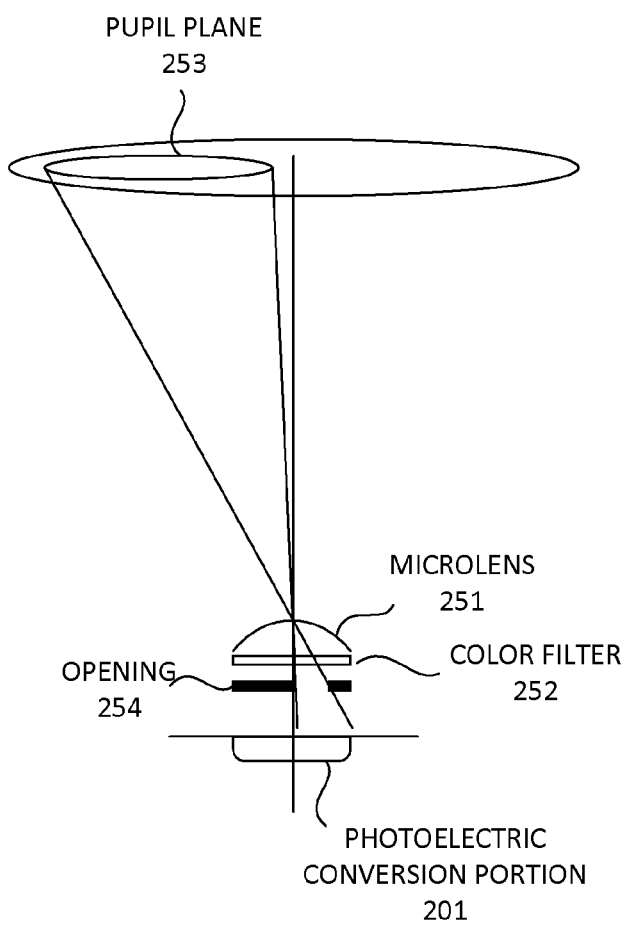
FIG. 3 is a diagram showing a correspondence relationship between a pupil plane and an opening of a pixel of an imaging apparatus according to another embodiment.

FIG. 3 is a diagram showing a configuration of a dedicated focus detection pixel and a correspondence relationship between a pupil plane and a photoelectric conversion portion according to another embodiment. Unlike FIG. 2, FIG. 3 shows a dedicated focus detection pixel. The shape of the pupil plane 253 is determined by an opening 254. In addition, in order to detect only light having passed through the pupil plane 253, a pixel to form a pair or, more specifically, a pixel for detecting light from a right-side pupil plane (not illustrated) in FIG. 3 must be separately provided to acquire a focus detected signal. By providing an entire screen region of the imaging portion 22 with the focus detection pixel shown in FIG. 3 and an imaging pixel, any subject that appears on the screen can be brought into focus by phase difference detection.

An image processing portion 24 performs prescribed resizing processing or prescribed color conversion processing such as pixel interpolation or reduction on data from an A/D converter 23 or data from a memory control portion 15. In addition, the image processing portion 24 performs prescribed arithmetic processing using image data of a captured image, and the system control portion 50 performs exposure control and ranging control based on a computation result obtained by the image processing portion 24. Accordingly, AF (automatic focusing) processing. AE (automatic exposure) processing, and EF (preliminary light emission before flash) processing in a TTL (through-the-lens) system are performed. The image processing portion 24 further performs prescribed arithmetic processing using image data of a captured image and also performs AWB (automatic white balance) processing in the TTL system based on an obtained computation result.

Output data from the A/D converter 23 is written into a memory 32 via the image processing portion 24 and the memory control portion 15 or directly written into the memory 32 via the memory control portion 15. The memory 32 stores image data obtained by the imaging portion 22 and converted into digital data by the A/D converter 23 and image data to be displayed on a display portion 28 as display means. The memory 32 has sufficient storage capacity for storing a prescribed number of still images and a prescribed time's worth of moving images and audio.

In addition, the memory 32 also doubles as a memory (a video memory) for image display. A D/A converter 19 converts data for image display stored in the memory 32 into an analog signal and supplies the analog signal to the display portion 28. In this manner, image data for display having been written into the memory 32 is displayed by the display portion 28 via the D/A converter 19. The display portion 28 performs display in accordance with an analog signal from the D/A converter 19 on a display such as an LCD. An electronic view finder function can be realized and a live image display (a live view display) can be performed by subjecting digital signals having been first subjected to A/D conversion by the A/D converter 23 and accumulated in the memory 32 to analog conversion by the D/A converter 19, and sequentially transmitting the signals having been subjected to analog conversion to the display portion 28 and displaying the signals. The display portion 28 corresponds to display means which displays an image picked up by the imaging means. It should be noted that the display portion 28 may be an electronic view finder which is peered into through an eyepiece (not illustrated) or a display on a rear surface of the digital camera 100. In addition, the digital camera 100 may have both an electronic view finder and a rear surface display as the display portion 28.

A nonvolatile memory 56 is an electrically erasable and recordable memory and, for example, an EEPROM is used. Constants, a program, and the like for operations of the system control portion 50 are stored in the nonvolatile memory 56. In this case, the program refers to a program for executing the various flow charts described later in the present embodiment.

The system control portion 50 controls the entire digital camera 100. The system control portion 50 has an arithmetic processor and realizes the respective processing steps of the present embodiment (to be described later) by having the arithmetic processor execute the program recorded in the nonvolatile memory 56 described earlier. Reference sign 52 denotes a system memory such as a RAM.

Constants and variables for the operations of the system control portion 50, the program read from the nonvolatile memory 56, and the like are stored in the system memory 52. In addition, the system control portion also performs display control by controlling the memory 32, the D/A converter 19, the display portion 28, and the like. A system timer 53 is a time-measuring portion for measuring time used in various controls and for measuring time according to an internal clock.

A power switch 72 is an operating member for switching power of a digital camera 100 on and off. A mode changeover switch 60, a first shutter switch 62, a second shutter switch 64, and an operating portion 70 are operating means for inputting various operation instructions to the system control portion 50. The mode changeover switch 60 switches an operating mode of the system control portion 50 to any of a still image recording mode, a moving image photography mode, a playback mode, and the like. Modes included in the still image recording mode are an automatic photography mode, an automatic scene determination mode, a manual mode, an aperture priority mode (Av mode), and a shutter speed priority mode (Tv mode). Other available modes include various scene modes that constitute photography settings for different photography scenes, a program AE mode, and custom modes. Examples of a scene mode include a sports scene mode and a high-speed subject photography mode. Using the mode changeover switch 60, the operating mode can be directly switched to any of these modes included in a menu button. Alternatively, after temporarily switching to a menu button using the mode changeover switch 60, another operating member may be used to switch to any of the modes included in the menu button. In a similar manner, the moving image photography mode may also include a plurality of modes.

The first shutter switch 62 is switched on during an operation of the shutter button 61 provided on the digital camera 100 by a so-called half-press (a photography preparation instruction) and generates a first shutter switch signal SW1. In accordance with the first shutter switch signal SW1, operations such as AF (automatic focusing) processing, AE (automatic exposure) processing, AWB (automatic white balance) processing and EF (preliminary light emission before flash) processing are started.

The second shutter switch 64 is turned on upon completion of an operation of the shutter button 61 by a so-called full-press (a photography instruction) and generates a second shutter switch signal SW2. In accordance with the second shutter switch signal SW2, the system control portion 50 starts a series of operations of photography processing from reading a signal from the imaging portion 22 to writing image data into the recording medium 200.

By selecting and operating various function icons displayed on the display portion 28, each operating member of the operating portion 70 is appropriately assigned a function for each scene and acts as one of various function buttons. Examples of the function buttons include an end button, a return button, an image feed button, a jump button, a narrow-down button, and an attribute change button. For example, w % ben a menu button is pushed, a menu screen enabling various settings to be configured is displayed on the display portion 28. A user can intuitively perform various settings using the menu screen displayed on the display portion 28, a four-way button corresponding to upward, downward, leftward, and rightward directions, and a SET button.

The operating portion 70 is constituted by various operating members as an input portion for receiving operations from a user. The operating portion 70 is provided with electronic buttons, four-way keys, and the like for performing menu selection, mode selection, playback of a photographed moving image, and the like.

In the present embodiment, an eye-gaze input operation portion 701 is provided as one of the operating portions 70. The eye-gaze input operation portion 701 is an operation member for detecting which location of the display portion 28 is being viewed by an eye-gaze of a user (observer) observing the display portion 28. The user can perform an operation using an eye-gaze position using the eye-gaze input operation portion 701.

Figure 4:
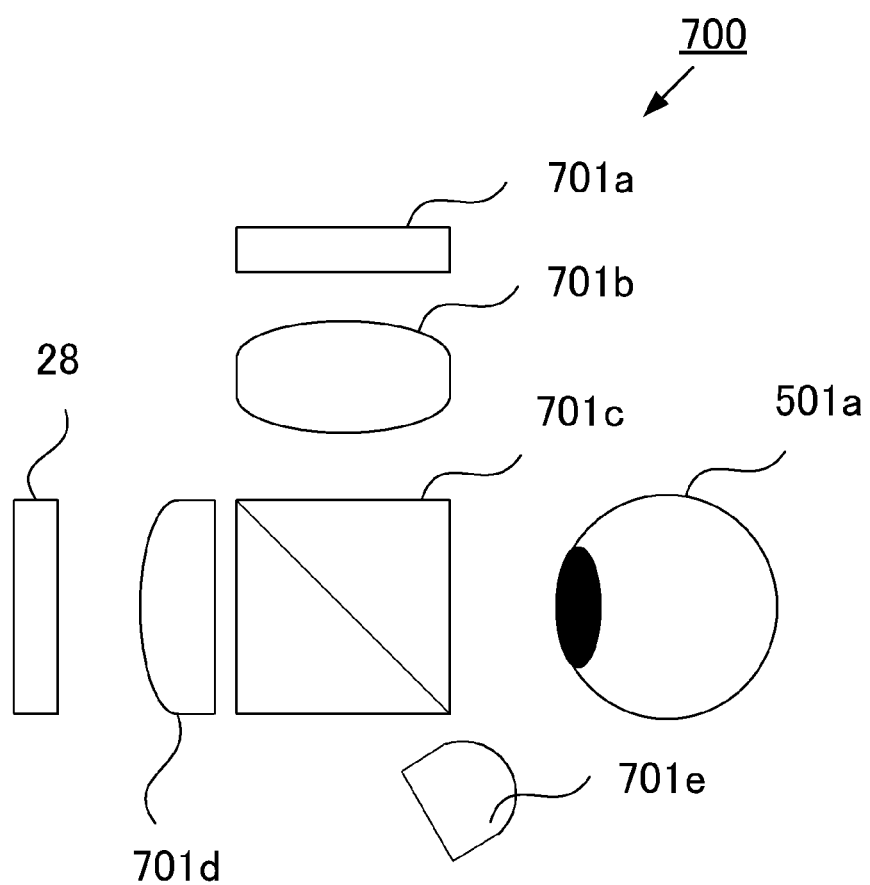
FIG. 4 is a diagram showing a configuration of an eye-gaze input operation portion according to the embodiment.

FIG. 4 shows an example of the eye-gaze input operation portion 701. The configuration shown in FIG. 4 is a configuration which realizes a system involving detecting a rotation angle of an optical axis of an eye 501a of a user peering into a finder's field of view and detecting an eye gaze of the user from the detected rotation angle. The eye-gaze input operation portion 701 according to the configuration is constituted of an image sensor 701a, a light receiving lens 701b, a dichroic mirror 701c, an eyepiece lens 701d, and an illuminating light source 701e. A live view display image having been photographed through the lens unit 150 is displayed on the display portion 28. The illuminating light source 701e projects infrared light to the eye 501a. Infrared light reflected by the eye 501a is reflected by the dichroic mirror 701c and photographed by the image sensor 701a. The photographed eye image is converted into a digital signal by an A/D converter (not illustrated) and transmitted to the system control portion 50. In the system control portion 50 as eye-gaze information generating means and eye-gaze position information outputting means, a region of a pupil and the like are extracted from a photographed eye image to calculate an eye-gaze of the user.

Figure 5:
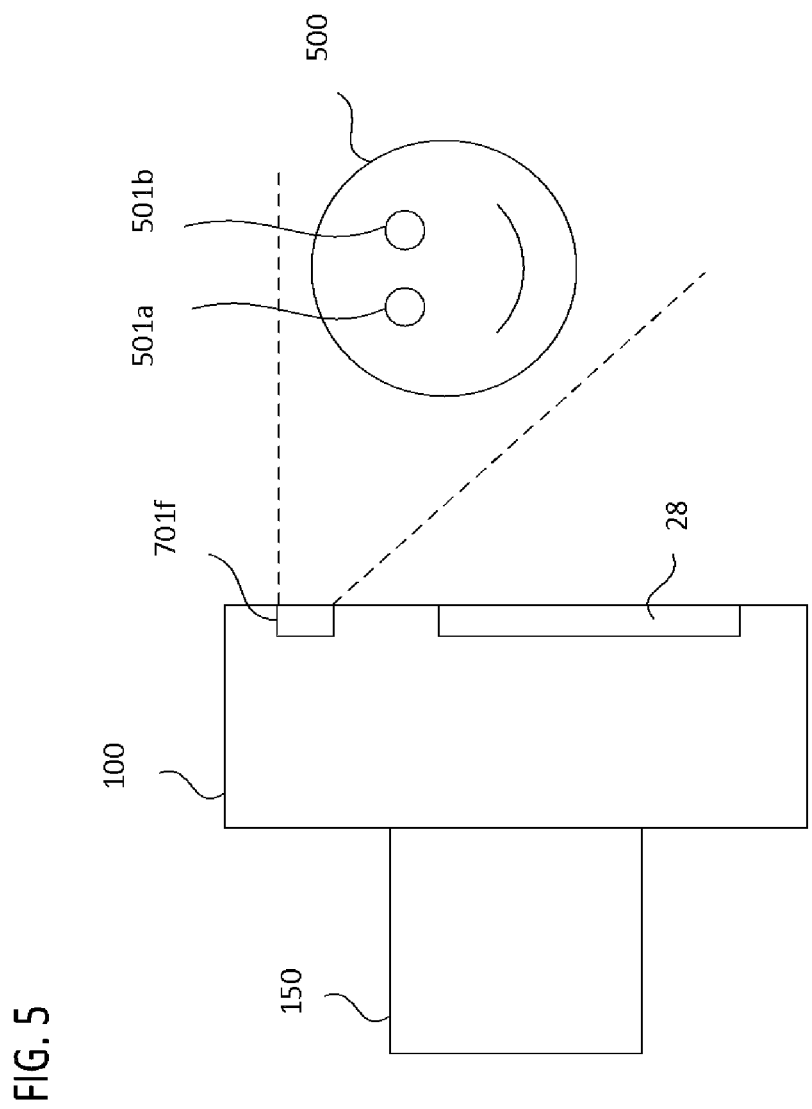
FIG. 5 is a diagram showing a configuration of the eye-gaze input operation portion according to the embodiment.

It should be noted that the eye-gaze input operation portion 701 is not limited to this system and may adopt a system which detects an eye gaze by photographing both eyes of the user. FIG. 5 shows an example of the eye-gaze input operation portion 701 which differs from FIG. 4. In FIG. 5, a live view display image having been photographed through the lens unit 150 is displayed on the display portion 28 provided on a rear surface of the digital camera 100. In FIG. 5, a camera 701f which photographs the face 500 of a user observing the display portion 28 is provided on the rear surface of the digital camera 100. In FIG. 5, an angle of view which is photographed by the camera 701f is indicated by a dotted line. Light is projected to the face of the user from the illuminating light source 701e (not illustrated) and an eye image is acquired by the camera 701f Accordingly, an eye gaze of the user is calculated. It should be noted that the eye-gaze input operation portion 701 is not limited to this system and any configuration enabling which location of the display portion 28 is being watched closely by the user to be detected may suffice.

A power supply control portion 80 is constituted by a battery detection circuit, a DC-DC converter, a switching circuit for switching between blocks to be energized, and the like, and detects whether or not a battery is mounted, a type of the battery, and a remaining battery level. In addition, the power supply control portion 80 controls the DC-DC converter on the basis of the detection results and an instruction from the system control portion 50 and supplies respective portions including the recording medium 200 with necessary voltage for a necessary period of time.

A power supply portion 30 is constituted by a primary battery such as an alkaline battery or a lithium battery, a secondary battery such as a NiCd battery, a NiMH battery, or a Li battery, an AC adapter, or the like. A recording medium I/F 18 is an interface with the recording medium 200 that is a memory card, a hard disk, or the like. The recording medium 200 is a recording medium such as a memory card for recording photographed images and is constituted by a semiconductor memory, a magnetic disk, or the like.

A communicating portion 54 is connected wirelessly or by a wired cable and transmits and receives video signals and audio signals. The communicating portion 54 is also capable of connecting to a wireless LAN (Local Area Network) or the Internet. The communicating portion 54 is capable of transmitting images (including live images) picked up by the imaging portion 22 and images recorded on the recording medium 200 as well as receiving image data and various other types of information from an external device.

An attitude detecting portion 55 detects an attitude of the digital camera 100 relative to a direction of gravitational force. Based on the attitude detected by the attitude detecting portion 55, a determination can be made as to whether an image photographed by the imaging portion 22 is an image photographed while holding the digital camera 100 horizontally or an image photographed while holding the digital camera 100 vertically. The system control portion 50 can add orientation information in accordance with the attitude detected by the attitude detecting portion 55 to an image file of the image picked up by the imaging portion 22, record a rotated version of the image, and the like. An acceleration sensor, a gyro sensor, or the like can be used as the attitude detecting portion 55.

The digital camera 100 described above enables photography using central single point AF and face AF. Central single point AF refers to performing AF with respect to a single central point in a photography screen. Face AF refers to performing AF with respect to a face in the photography screen as detected by a face detection function.

A face detection function will be described. The system control portion 50 sends image data of a face detection object to the image processing portion 24. Under the control of the system control portion 50, the image processing portion 24 applies a horizontal direction bandpass filter to the image data. In addition, under the control of the system control portion 50, the image processing portion 24 applies a vertical direction bandpass filter to the processed image data. Due to the horizontal and vertical direction bandpass filters, an edge component is detected from the image data.

Subsequently, the system control portion 50 performs pattern matching with respect to the detected edge component and extracts groups of candidates of eyes, noses, mouths, and ears. In addition, among the extracted group of eye candidates, the system control portion 50 determines candidates satisfying conditions set in advance (for example, an inclination of or a distance between two eyes) to be a pair of eyes and narrows down the extracted group of eye candidates to those including a pair of eyes. Furthermore, the system control portion 50 associates the narrowed-down group of eye candidates with other facial parts (a nose, a mouth, and ears) corresponding to the group of eye candidates and detects a face by applying a non-facial condition filter set in advance. The system control portion 50 outputs the face information described above in accordance with a result of the face detection and ends the processing. At this point, a feature amount such as the number of faces is stored in the system memory 52. A method of realizing a face detection function is not limited to the method described above and the number of faces, sizes of faces, parts of faces, and the like may be detected by a method using known machine learning. In addition, a subject type is not limited to a human face and animals, vehicles, or the like may be detected instead.

As described above, a feature amount of image data being displayed in a live view or being reproduced and displayed can be extracted and subject information can be detected by performing an image analysis on the image data. While face information has been described as an example of subject information in the present embodiment, subject information also includes various kinds of information such as red-eye determination, eye detection, closed-eye detection, and smile detection.

Face AE, face FE, and face WB can be performed concurrently with face AF. Face AE refers to optimizing exposure of an entire screen in accordance with a brightness of a detected face. Face FE refers to dimming a flash by focusing on the detected face. Face WB refers to optimizing WB of an entire screen in accordance with a color of the detected face.

Explanation of Eye-Gaze Detection and Photographic Operation

Hereinafter, a detection processing method of an eye-gaze position according to the present embodiment will be explained with reference to FIGS. 6 to 16.

Figure 6:
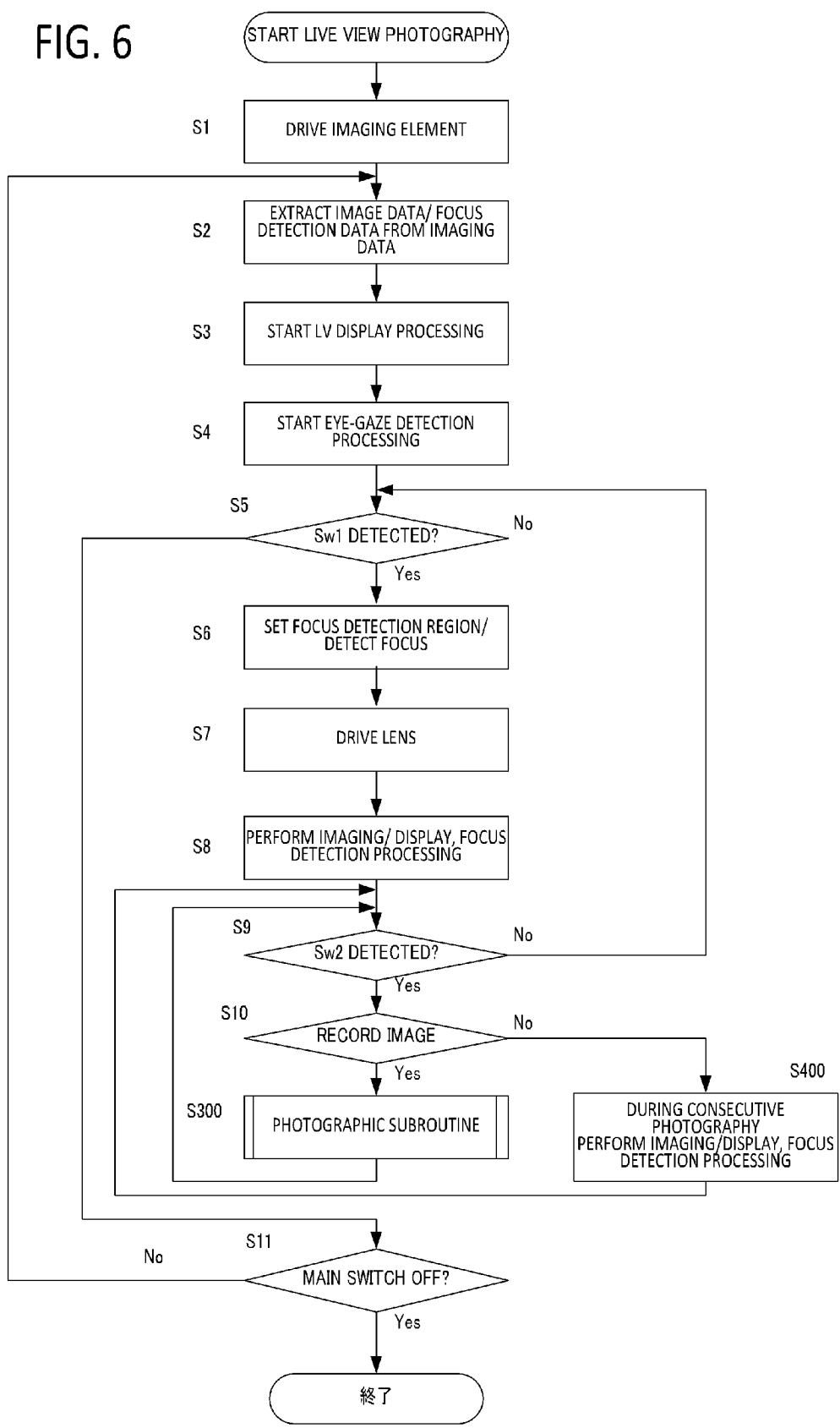
FIG. 6 is a flow chart showing a photographing operation according to the embodiment.

FIG. 6 is a flow chart for explaining focus detection, eye-gaze detection, and a photographic operation by the imaging apparatus according to the present embodiment. FIG. 6 shows an operation during live view photography in which photography is performed from a live view state (moving image photography state) such as a photography stand-by state and which is mainly realized by the system control portion 50.

In S1, in accordance with control of the system control portion 50, the imaging portion 22 is driven and imaging data is acquired. Since the acquired imaging data is not imaging data to be recorded (to be described later) but an image for detection and display, a smaller image than a recorded image is acquired. In S1, an image with sufficient resolution for focus detection, subject detection, or live view display is acquired. In this case, since the drive operation is for photographing a moving image for live view display, photography using a so-called electronic shutter is performed in which a charge is accumulated and read out over a period of time in accordance with a frame rate for live view display. The live view display performed at this time is carried out by the photographer to check a photographic range, photographing conditions, and the like and may be set to, for example, 30 frames/second (photographing interval: 33.3 ms) or 60 frames/second (photographing interval: 16.6 ms).

In S2, the system control portion 50 acquires focus detection data obtained from a first focus detection pixel and a second focus detection pixel included in a focus detection region among the imaging data obtained in S1. In addition, the system control portion 50 adds up output signals of the first focus detection pixel and the second focus detection pixel to generate an imaging signal and acquires image data obtained by applying color interpolation processing and the like using the image processing portion 24. In this manner, image data and focus detection data can be acquired by one photographic session. When a pixel configuration of the imaging pixel differs from that of the first focus detection pixel and the second focus detection pixel, image data is acquired by performing interpolation processing of the like of the focus detection pixel on the data obtained from the imaging pixel.

In S3, based on the image data obtained in S2, the system control portion 50 generates an image for live view display using the image processing portion 24 and displays the image on the display portion 28. The image for live view display is, for example, a reduced image conforming to the resolution of the display portion 28 and, alternatively, reduction processing can be performed by the image processing portion 24 when generating the image data in S2. In this case, the system control portion 50 causes the display portion 28 to display the image data acquired in S2. As described above, since photography and display at a prescribed frame rate are performed during live view display, the photographer can adjust a composition, exposure conditions, and the like during photography through the display portion 28. In addition, as described above, in the present embodiment, the face of a person, an animal, and the like can be detected as a subject. In S3, a frame indicating a region of the subject being detected and the like are also displayed in time with the start of live view display.

In S4, the system control portion 50 starts eye-gaze detection and focus detection. After S4, the eye-gaze input operation portion 701 acquires, at a prescribed time interval, a location on the display portion 28 being observed by the photographer (eye-gaze position) in association with a display image being observed by the photographer. Processing (smoothing processing) for suppressing variation is performed on the detected eye-gaze position. When a display setting of the eye-gaze position (pointer) is set to "display" or on, in order to notify the photographer of the detected eye-gaze position, the system control portion 50 displays the pointer at a position or a region corresponding to the eye-gaze position (the eye-gaze position after the processing described above) on the display portion 28. When the display setting of the eye-gaze position is set to "no display" or off, the system control portion 50 does not display the pointer representing the eye-gaze position on the display portion 28. Detection and processing of the eye-gaze position in S4 will be described later. The system control portion 50 which performs control for displaying the pointer on the display portion 28 corresponds to pointer display means which displays a pointer indicating an eye-gaze position of the observer on the display portion 28 when the display setting is set to on.

In S5, the system control portion 50 detects an on/off state of the first shutter switch 62 (Sw1) indicating start of photography preparation. A shutter button 61 which is one of the operating portions 70 is capable of detecting an on/off state in two stages in accordance with an amount of depression, and the on/off state of Sw1 described above corresponds to an on/off state of a first stage of a release (photographic trigger) switch.

When an on state of Sw1 is not detected (or when off is detected) in S5, the system control portion 50 advances processing to S11 to determine whether or not a main switch included in the operating portion 70 has been turned off. On the other hand, when an on state of Sw1 is detected in S5, the system control portion 50 advances processing to S6 to set a focus detection region to be brought into focus and to perform focus detection. The first shutter switch (Sw1) 62 corresponds to accepting means which accepts a determination operation for determining input of an eye-gaze position, and the system control portion 50 sets the focus detection region using the post-processing eye-gaze position at a time point of accepting the determination operation.

Due to various factors, the eye-gaze position detected in S4 has an error with respect to a position of the subject which is intended by the photographer. In the present embodiment, eye-gaze position information with higher accuracy is acquired by subjecting information on the detected eye-gaze position to processing depending on the situation, control of a detection timing, or the like. Details will be provided later.

In S6, the system control portion 50 sets the focus detection region using the eye-gaze position information (eye-gaze position information after processing, second eye-gaze information) having been subjected to processing to be described later and performs focus detection processing with respect to the focus detection region. The system control portion 50 may display an AF frame (also referred to as a focus detection frame) which is a frame indicating the set detected focus detection region on the display portion 28. A display indicating the focus detection region is a rectangular frame representing the focus detection region and is also referred to as an AF frame. After S6, setting of a focus detection region using eye-gaze position information and focus detection processing are repetitively executed every time imaging is performed.

While details of setting the focus detection region in S6 will be described later, first, focus detection processing with respect to a focus detection region will be described. Focus detection processing is processing of obtaining an amount of deviation (a defocus amount) and an orientation (front-rear) of the deviation of a focal point in a focus detection region.

Using focus detection data corresponding to the set focus detection region, the system control portion 50 obtains a defocus amount and an orientation for each focus detection region. In the present embodiment, the system control portion 50 is to perform processing for generating an image signal for focus detection, calculating an amount of deviation (a phase difference) of a focus detection signal, and obtaining the defocus amount and an orientation from the calculated amount of deviation.

The system control portion 50 performs shading correction and filter processing on a first focus detection signal and a second focus detection signal obtained as image signals for focus detection from the set focus detection region and performs reduction of a difference in light amounts of the pair of signals and extraction of a signal with a spatial frequency at which phase difference detection is to be performed. Next, the system control portion 50 performs shift processing in which the first focus detection signal and the second focus detection signal after filter processing are relatively shifted in a pupil-splitting direction and calculates an amount of correlation which represents a degree of matching of the signals.

Let A(k) denote a k-th first focus detection signal and B(k) denote a k-th second focus detection signal after filter processing, and let W denotes a range of the number k corresponding to a focus detection region. Furthermore, if s1 denotes a shift amount due to shift processing and Γ1 denotes a shift range of the shift amount s1, then an amount of correlation COR is calculated by expression (1).

[Math. 1]

$$COR(s_1) = \Sigma_{k \in W} |A(k) - B(k-s_1)|, s_1 \in \Gamma 1 \tag{1}$$

Due to shift processing by the shift amount s1, the k-th first focus detection signal A(k) and a k-s1-th second focus detection signal B(k-s1) are made to correspond to each other and subtracted to generate a shift subtraction signal. An absolute value of the generated shift subtraction signal is calculated, a sum of the number k is obtained within the range W corresponding to the focus detection region, and an amount of correlation COR(s1) is calculated. When necessary, the amount of correlation calculated for each row can be added up across a plurality of rows for each shift amount.

Next, a shift amount of a real number value which minimizes the amount of correlation is calculated by sub-pixel calculation from the amount of correlation and the calculated shift amount is assumed to be an amount of image deviation p1. In addition, the calculated amount of image deviation p1 is multiplied by an image height of the focus detection region, an F value of an imaging lens (image pickup optical system), and a conversion coefficient KI in accordance with an exit pupil distance to detect a detection defocus amount.

In S7, based on the defocus amount detected in the selected focus detection region, the system control portion 50 performs lens drive so that the focus detection region comes into focus. When the detected defocus amount is smaller than a prescribed value, lens drive need not necessarily be performed.

In S8, the system control portion 50 performs acquisition of the image for detection and display and live view display performed in S1 and the focus detection processing performed in S6. The subject region detected as described above is displayed superimposed on the live view display. In addition, when the display setting of the display pointer is enabled, information on the eye-gaze position is also superimposed and displayed using processed eye-gaze position information (second eye-gaze information). The processing performed in S8 may be performed in parallel while lens drive is being performed in S7. Furthermore, the focus detection region may be changed in accordance with the live view display which is updated from time to time and in correspondence to the obtained eye-gaze position.

Once the focus detection processing is finished, the routine advances to S9 and the system control portion 50 detects an on/off state of the second shutter switch 64 (Sw2) indicating a photography start instruction. The release (photographic trigger) switch which is one of the operating portions 70 is capable of detecting an on/off state in two stages in accordance with an amount of depression, and Sw2 described above corresponds to an on/off state of a second stage of the release (photographic trigger) switch. When an on state of Sw2 is not detected in S9, the system control portion 50 returns to S5 and detects an on/off state of Sw1.

When an on state of Sw2 is detected in S9, the system control portion 50 advances processing to S10 to determine whether or not image recording is to be performed. In the present embodiment, processing for image acquisition during consecutive photography is switched between image acquisition for recorded images, imaging/display, and image acquisition for focus detection. Switching may be alternated or, for example, imaging/display and focus detection may be performed once every three times. Accordingly, highly accurate focus detection can be performed without significantly reducing the number of photographic sessions per unit time.

When it is determined that image recording is to be performed in S10, the routine advances to S300 to execute a photographic subroutine. Details of the photographic subroutine will be provided later. When the photographic subroutine is executed in S300, the routine returns to S9 to determine whether or not an on state of Sw2 is detected or, in other words, whether or not a consecutive photography instruction has been issued.

When it is determined that imaging/display or focus detection is to be performed in S10, the routine advances to S400 to execute imaging/display during consecutive photography and focus detection processing. Contents of processing to be executed in the imaging/display during consecutive photography and the focus detection processing are the same as in S8. In accordance with a photographic frame speed of consecutive photography, recorded image generation processing, and the like, a display period, a display update rate (interval), and a display delay of the image picked up in S400 differ from the processing in S8. The system control portion 50 as the display controlling means performs the display control described above. When the display period, the display update rate (interval), or the display delay of the display image changes during consecutive photography as in the present embodiment, the eye-gaze position of the photographer is affected in no small measure. In the present embodiment, in consideration of the fact that an error arises in the detected eye-gaze position in accordance with a state or switching of the display specifications described above, control of processing of the eye-gaze position and detection processing are appropriately performed. Accordingly, an eye-gaze position with high accuracy can be acquired regardless of a change in display specifications. As described above, the obtained eye-gaze position information is used to set a focus detection region, associate the focus detection region with a detected subject region, and the like. Details will be provided later. When imaging/display during consecutive photography or focus detection processing is executed in S400, the routine returns to S9 to determine whether or not an on state of Sw2 is detected or, in other words, whether or not a consecutive photography instruction has been issued.

When an on state of Sw1 is not detected (or when off is detected) in S5 and, at the same time, when off of the main switch is detected in S11, focus detection and photographic operation are ended. On the other hand, when off of the main switch is not detected in S11, the routine returns to S2 to acquire image data and focus detection data.

Next, details of the photographic subroutine to be executed in S300 in FIG. 6 will be explained using the flow chart shown in FIG. 7. The series of operations of the present subroutine is also mainly realized by the system control portion 50.

In S301, the system control portion 50 executes exposure control processing and determines photographing conditions (shutter speed, aperture value, and photographing sensitivity). While the exposure control processing can be performed by the system control portion 50 based on brightness information of image data, any known technique can be used. Details of a timing at which image data to be used when performing exposure control processing is obtained and the like in the present embodiment will be provided later.

In S301, the system control portion 50 controls an operation of the shutter 101 based on the determined aperture value and shutter speed. In addition, the system control portion 50 causes charge accumulation to be performed during a period in which the imaging portion 22 is exposed through the shutter 101.

When the exposure period ends, in S302, the system control portion 50 reads an image for high pixel still image photography or, in other words, reads all pixels. In addition, an image of either the first focus detection pixel or the second focus detection pixel is read out. A signal read from a focus detection pixel is used to detect a focal state of the subject during image reproduction. Therefore, with respect to a recorded image of high pixel still image photography, a read data amount can be reduced by restricting a region or making all pixels low resolution. When a signal of the first focus detection pixel or the second focus detection pixel is available, the other focus detection signal can be calculated by calculating a difference from an image for high pixel still image photography. In the present embodiment, in order to prioritize S/N of a signal of the image for high pixel still image photography, the image signal for high pixel still image photography and one focus detection signal are read and recorded but the other focus detection signal is obtained by calculation. Subsequent processing with respect to an image is performed with respect to the image signal for high pixel still image photography and the one focus detection signal.

In S303, the system control portion 50 performs defective pixel correction processing on read image data with the image processing portion 24. In S304, with respect to the image data after defective pixel correction, the system control portion 50 causes the image processing portion 24 to apply image processing such as demosaicing (color interpolation) processing, white balance processing, γ correction (gray level correction) processing, color conversion processing, and edge enhancement processing, encoding processing, or the like. In S305, the system control portion 50 records the image signal for high pixel still image photography and the one focus detection signal as an image data file in the memory 32.

In S306, in correspondence to the photographed image recorded in S305, the system control portion 50 records characteristic information of the camera main body in the memory 32 and in a memory inside the system control portion 50. In this case, information such as the following can be exemplified as the characteristic information of the camera main body.

Photographing conditions (aperture value, shutter speed, photographic sensitivity, and the like)
Information related to image processing applied in the image processing portion 24
Light reception sensitivity distribution information of imaging pixel and focus detection pixel of imaging portion 22
Vignetting information of photographic luminous flux inside camera main body
Information on distance from mounting surface between camera main body and lens unit to imaging portion 22
Manufacturing error information Since the light reception sensitivity distribution information of the imaging pixel and the focus detection pixel of the imaging portion 22 is information which is dependent on an on-chip micro lens ML and the photoelectric conversion portion PD, information regarding these members may be recorded. Light reception sensitivity distribution information is information on sensitivity in accordance with a position at a prescribed distance on an optical axis from an imaging element. In addition, light reception sensitivity distribution information may be information on a change in sensitivity with respect to an angle of incidence of light.

In S307, in correspondence to the photographed image recorded in S305, the system control portion 50 records characteristic information of the lens unit in the memory 32 and the memory inside the system control portion 50. Examples of characteristic information of the lens unit include information on an exit pupil, frame information, focal length or F number information at the time of photography, aberration information, manufacturing error information, and subject distance information associated with a focusing lens position during photography.

In S308, the system control portion 50 records image-related information regarding the photographed image in the memory 32 and the memory inside the system control portion 50. Image-related information may include information regarding a focus detection operation prior to photography, subject movement information, and information regarding accuracy of the focus detection operation.

In S309, the system control portion 50 performs preview display of the photographed image on the display portion 28. Accordingly, the photographer can readily check the photographed image. Since an object of the image used in the preview display performed in S309 is to simply check the image, the various types of processing to be performed in S303 and S304 need not be performed. When the various types of processing are not performed, performing the preview display of S309 in parallel to processing of S303 and thereafter enables a time lag from exposure to display to be further reduced.

When the processing of S309 is finished, the system control portion 50 ends the photographic subroutine of S300 and advances processing to S9 of the main routine. In the present embodiment, during consecutive photography, an acquired image is displayed both when the image is to be recorded in the photographic subroutine of S300 and when imaging/display during consecutive photography and focus detection processing are performed in S400.

Eye-Gaze Position Processing Flow

Next, with reference to FIG. 8, details of the eye-gaze position detection processing in S4 of FIG. 6 and, particularly, processing of an eye-gaze position in order to improve accuracy of information of a detected eye-gaze position will be explained. FIG. 8 is a flow chart for explaining a processing method of eye-gaze position information. The processing shown in FIG. 8 is executed in parallel, mainly by the system control portion 50, in S4 of FIG. 6 and thereafter.

When eye-gaze detection is started in S4 of FIG. 6, the system control portion 50 continuously performs processing of detecting an eye-gaze position of the photographer from an eye image photographed by the image sensor 701a of the eye-gaze input operation portion 701. Detection of the eye-gaze position may be performed based on positions of a center of a pupil and a Purkinje image. The detected eye-gaze position is stored in the memory 32 in association with the display image being observed by the photographer. While information related to the eye-gaze position obtained from a single eye image will be referred to as "pre-processing eye-gaze position information" (first eye-gaze information), when clearly distinguishable from post-processing eye-gaze position information to be described later, the information may simply be referred to as eye-gaze position information. It is assumed that, at a time point where processing shown in FIG. 8 is started, a plurality of pieces of pre-processing eye-gaze position information are stored in the memory 32.

In S201, the system control portion 50 acquires pre-processing eye-gaze position information detected in a plurality of latest frames from the memory 32. It should be noted that the system control portion 50 which acquires pre-processing eye-gaze position information (first eye-gaze information) from the memory 32 corresponds to first acquiring means which acquires first eye-gaze information of an observer observing the display portion 28.

Figure 17A:
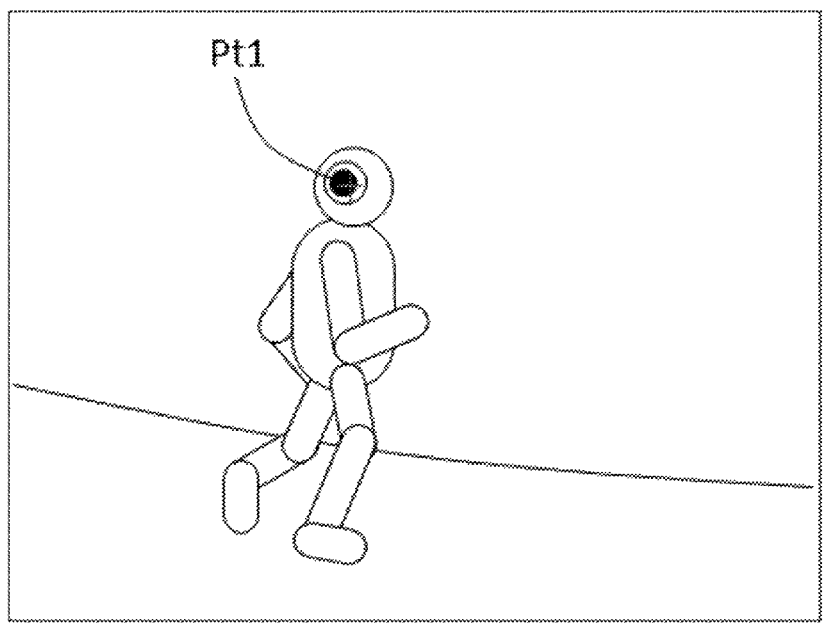
FIGS. 17A and 17B are diagrams for explaining an example of a live view display.
Figure 17B:
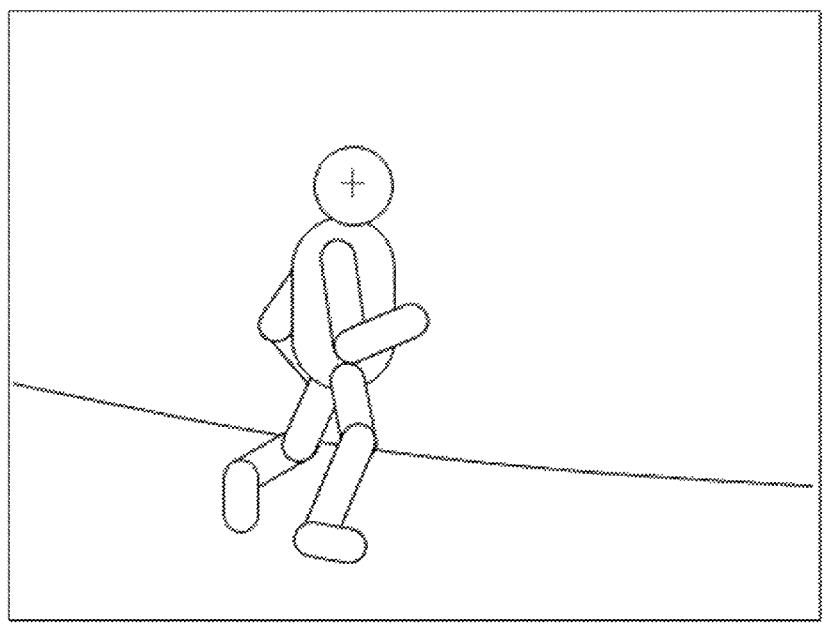

In S202, the system control portion 50 acquires live view setting information within a period of acquiring the eye-gaze position information or at a present time point. The live view setting information includes display setting information of a pointer which indicates whether a pointer for notifying an eye-gaze position is to be displayed or hidden. FIG. 17A is a live view image during a pointer display setting and FIG. 17B is a live view image during a pointer non-display setting. During pointer display, a pointer Pt1 is displayed with the eye-gaze position as a center but during pointer non-display, the pointer Pt1 is not displayed. In the imaging apparatus according to the present embodiment, in accordance with the live view setting information (pointer display setting), timings at which the photographer determines an eye-gaze position differs and an effect of a variation in eye-gaze positions and a delay due to processing on system operations and usability of the user differs. Therefore, in the present embodiment, contents of processing of the eye-gaze position information obtained in S201 are switched in accordance with the live view setting information acquired in S202. In other words, the system control portion 50 corresponds to second acquiring means which acquires post-processing eye-gaze position information (second eye-gaze information) by different methods depending on the display setting of a pointer. The reason why a variability in eye-gaze position and an influence of delay differ depending on live view setting information will be described later.

In S203, the system control portion 50 determines whether or not the live view setting information acquired in S202 is pointer non-display. In the case of pointer non-display, the processing is advanced to S204, but in the case of pointer display, the processing is advanced to S205.

Next, in the case of pointer non-display, in S204, the system control portion 50 sets a reliability determination threshold (Th2), the number of jump determination frames (N2), and the number of averaging frames (N4) which are parameters used in the processing steps of S206 to S208 to values to be applied when the display setting is non-display.

Next, in the case of pointer display, in S205, the system control portion 50 sets a reliability determination threshold (Th1), the number of jump determination frames (N1), and the number of averaging frames (N3) which are parameters used in the processing steps of S206 to S208 to values to be applied when the display setting is display.

In this case, the reliability determination threshold Th1 is smaller than the reliability determination threshold Th2, the number of jump determination frames N1 is larger than the number of jump determination frames N2, and the number of averaging frames N3 is larger than the number of averaging frames N4. The reasons for adopting such parameters in the cases of pointer display and pointer non-display will be described later.

In S206, the system control portion 50 performs reliability determination of the pre-processing eye-gaze position information. The system control portion 50 which executes S206 corresponds to first determining means which determines whether or not the pre-processing eye-gaze position information (first eye-gaze information) is reliable.

Depending on a physiological variation in the pupil of the photographer, a detection variation of a detector which detects an eye gaze, and the like, the detected eye-gaze position information may represent a position which differs from a position intended by the photographer. Therefore, a reliability determination of the eye-gaze position information is performed, in which case eye-gaze position information without reliability is not used in processing of the eye-gaze information performed in S208 and processing is performed using only eye-gaze position information with reliability. In addition, in the present embodiment, different types of reliability determination processing is performed in accordance with a display setting of a pointer. Details of the reliability determination in S206 will be provided later.

In S207, the system control portion 50 performs jump determination of the pre-processing eye-gaze position information. The system control portion 50 which executes S207 corresponds to second determining means which determines whether or not a jump of the pre-processing eye-gaze position information (first eye-gaze information) has occurred.

Cases where the detected eye-gaze position has changed significantly include cases where the significant change has been intended by the photographer and cases where the significant change is caused by the variation described above. In addition, a determination method of the eye-gaze position after processing is desirably changed depending on which factor has caused the significant change in the eye-gaze position. In consideration thereof, the system control portion 50 performs a determination with respect to positional information detected a plurality of times as to whether or not a difference from a specific frame is equal to or greater than a prescribed value, and when the number of consecutive frames of which the difference is equal to or greater than the prescribed value is equal to or larger than a prescribed number of frames, the system control portion 50 determines that the significant change (jump) is intended by the photographer. In addition, in the present embodiment, different types of determination processing is performed in accordance with a display setting of a pointer. Details of the jump determination in S207 will be provided later.

In S208, the system control portion 50 performs processing of eye-gaze position information. The system control portion 50 which executes S208 corresponds to second acquiring means which acquires post-processing eye-gaze position information based on the pre-processing eye-gaze position information (first eye-gaze information).

The processing according to the present embodiment is smoothing processing with respect to positional information (coordinates) detected a plurality of times and is processing for suppressing a variation in positional fluctuations of the pre-processing positional information so that the positional change becomes gradual. In the present embodiment, the system control portion 50 performs different types of processing in accordance with a display setting of a pointer. Specifically, the number of pieces (the number of frames) of eye-gaze position information used in the smoothing processing differs in accordance with the display setting of a pointer. In addition, the eye-gaze position information used in the smoothing processing differs in accordance with a result of the reliability determination in S206 and a result of the jump determination in S207. Therefore, contents of the processing of eye-gaze position information differs as processing steps performed in S204 to S208 are changed in accordance with the display setting of a pointer (the determination result in S203). Further details of the processing of eye-gaze position information in S208 will be provided later.

In S209, the processed eye-gaze position information is output. The output information is used to set a focus detection region as explained in S6 in FIG. 6 described above. Once the processing of S209 is finished, the processing of the present flow ends.

Relationship Between Variation and Delay

Figure 9A:
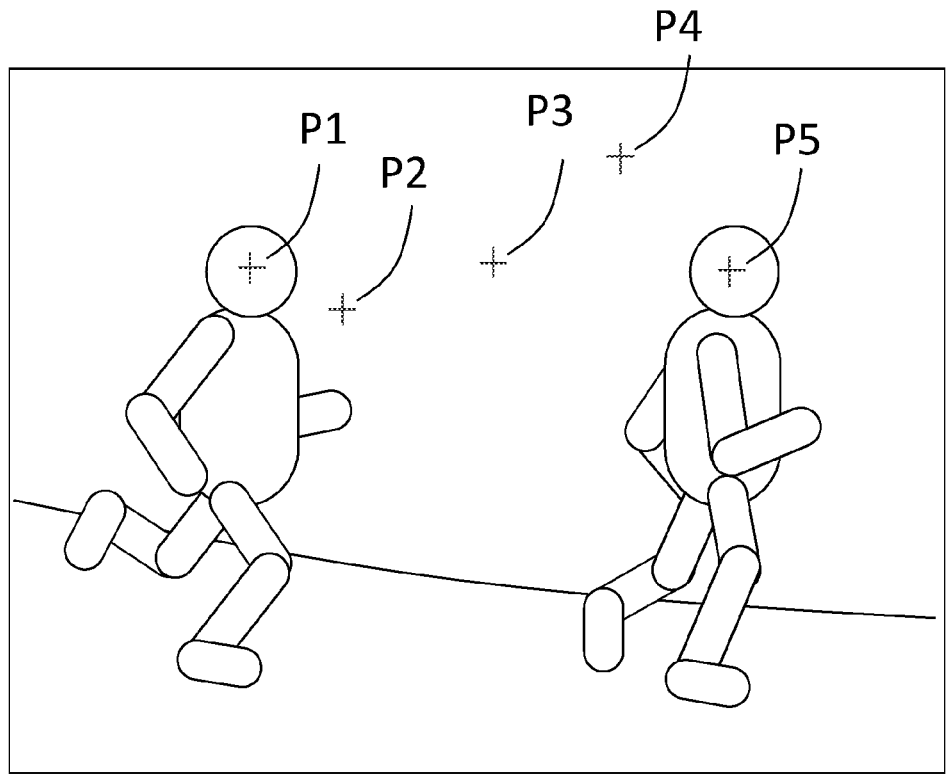
FIGS. 9A and 9B are diagrams for explaining why a variation in eye-gaze position and an influence of delay differ in live view setting information according to the embodiment.
Figure 9B:
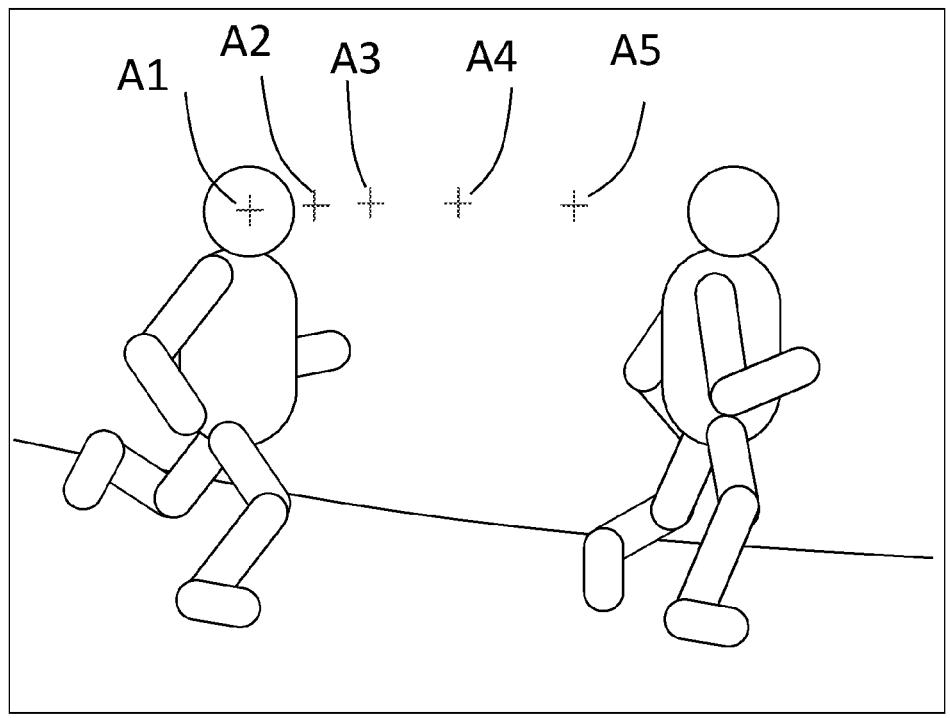

A reason why a variation in eye-gaze positions and a delay due to processing have different influences on a determined eye-gaze position and usability of the user in live view setting information described in S202 in FIG. 8 will now be explained with reference to FIGS. 9A and 9B. FIGS. 9A and 9B show an example of a scene being photographed which represents a situation where a photographic object is changed from a person on a left side to a person on a right side and an eye gaze is being moved. P1 to P5 in FIG. 9A denote eye-gaze positions before processing and A1 to A5 in FIG. 9B denote eye-gaze positions after processing. The processing is averaging processing of a plurality of frames and, for example, A3 is calculated by averaging processing of the eye-gaze positions denoted by P1 to P3.

The eye-gaze positions before processing shown in FIG. 9A vary for each frame as indicated by P1 to P5 and, since the eye-gaze positions fluctuate, displaying pointers at the eye-gaze positions without modification does not offer the photographer display with good visibility. Since eye-gaze positions include a variation due to observing a moving subject in addition to a variation that occurs even when focusing on a fixed point, it is difficult to always continuously focus on a pupil of the face of a person and such phenomena occur because a certain amount of error variation is included.

On the other hand, the eye-gaze positions after processing in FIG. 9B indicate a situation where variation is suppressed to a small amount compared to the eye-gaze position display denoted by P1 to P5. In this manner, since fluctuation of the eye-gaze positions after processing is reduced due to suppression of variation, the eye-gaze positions are highly visible from the photographer. However, since the post-processing eye-gaze positions A1 to A5 are calculated from eye-gaze information of a plurality of frames, delay occurs with respect to the pre-processing eye-gaze positions Pt to P5. In other words, by obtaining a post-processing eye-gaze position by averaging actual eye-gaze positions of a plurality of frames prior to the present, the post-processing eye-gaze position ends up being a position viewed at a time point preceding the eye-gaze position at the present time point.

When the live view setting is pointer display enabled, since the photographer can execute a determination operation by checking that the pointer overlaps with the subject, the subject can be appropriately selected even when a delay occurs. On the other hand, since a pointer is displayed, visibility deteriorates when eye-gaze positions vary. Therefore, when the pointer display setting is enabled, processing of eye-gaze positions is performed with an emphasis on visibility over delay suppression.

When the live view setting is pointer non-display, the photographer cannot execute a determination operation by checking that the pointer overlaps with the subject. Since the photographer executes the determination operation at a time point where the photographer thinks the subject is viewed, the timing at which the determination operation is executed is earlier than when the live view setting is pointer display and, in some cases, the subject cannot be selected due to a delay effect. On the other hand, since a pointer is not displayed, visibility is not affected by a variation in eye-gaze positions. Therefore, when the setting is pointer non-display, processing of eye-gaze positions is performed with an emphasis on delay suppression over visibility.

Reliability Determination

The reliability determination explained in S206 of FIG. 8 will be explained with reference to FIG. 10. In FIG. 10, an abscissa represents time and an ordinate represents a reliability assessment value. I1 to I11 denote reliability assessment values with respect to eye-gaze information of the respective frames. Th1 denotes the reliability determination threshold when the live view setting is pointer display setting: on and Th2 denotes the reliability determination threshold when the live view setting is pointer display setting: off, in which case Th1 is smaller than Th2.

In the present embodiment, the reliability determination threshold Th1 when the display setting of a pointer is on is set to a strict value, and when the display setting of a pointer is off (non-display), the reliability determination threshold Th2 is set to a lenient value as compared to Th1. Therefore, when the display setting of a pointer is on, reliability determination is performed using a stricter determination threshold than when the display setting is off. In FIG. 10, I5 and I11 represent poor reliability when the setting is pointer display but only I11 represents poor reliability when the setting is pointer non-display.

The reason for using a stricter reliability determination threshold when the display setting of a pointer is on as compared to when the display setting is off is as follows. The stricter the reliability determination threshold, the larger the number of frames of which reliability is determined to be poor. As will be described later, in the processing of eye-gaze position information in S208, a post-processing eye-gaze position is obtained without using eye-gaze positions determined to be unreliable in the processing of eye-gaze positions and only using eye-gaze positions determined to be reliable. Therefore, the stricter the reliability determination threshold, the more likely a post-processing eye-gaze position is to be obtained without the eye-gaze positions of latest frames being reflected thereon. In such a case, an influence of delay of eye-gaze positions due to processing increases. As described above, in the present embodiment, since processing which emphasizes delay suppression is performed when the setting is pointer non-display rather than pointer display, the threshold Th1 is made strict to emphasize stability when the setting is pointer display but the threshold Th2 is made lenient when the setting is pointer non-display in order to reduce the influence of delay.

A reliability assessment value will be explained. FIG. 16 is a schematic view showing a correlation between the center of a pupil and a Purkinje image in an orientation of each eye gaze. In the drawing, reference numeral 701 denotes a Purkinje image and 702 denotes a pupil.

Generally, an eye-gaze detection sensor is often calibrated and used at a center position and, therefore, the eye-gaze detection sensor is designed so as to have maximum detection accuracy at the center position. While a corneal reflection method which calculates an eye-gaze position by detecting a change in a relative positional relationship between the center of a pupil and a Purkinje image is generally known as a detection method of an eye-gaze position, there is a problem in that detection accuracy differs with respect to the eye-gaze position. This is because while near infrared light used to acquire a Purkinje image irradiates a location which is slightly deviated from the center of the pupil due to layout constraints, since irradiation light is obliquely incident to the front of the eye, the acquired Purkinje image is observed at a location which is slightly deviated from the center of the eye. In addition to the problem described above, there is also a problem in that a change in eye-gaze position due to eye-gaze detection accuracy is anisotropic. One reason therefor is, as shown in FIG. 16, when the center of a pupil moves in an opening/closing direction of an eyelid (up-down direction), detection accuracy of the center of the pupil readily declines when a part of the pupil becomes hidden by the eyelid.

While the eye-gaze detection accuracy described above is attributable to an eye-gaze detection sensor, other items attributable to people which affect eye-gaze detection accuracy include involuntary eye movement. Since involuntary eye movement also varies in accordance with an eye-gaze position and individual variability is significant, with respect to eye-gaze detection accuracy, individual data is preferably accommodated by acquiring a magnitude of involuntary eye movement for every eye-gaze position.

As described above, a variation in eye-gaze detection accuracy due to eye-gaze position is determined by a combination of factors attributable to an eye-gaze detection sensor and factors attributable to people. In order to perform eye-gaze detection with high accuracy while taking these factors into consideration, an eye-gaze processing method of a subsequent stage must be optimized based on reliability of eye-gaze detection data.

A conceivable method of acquiring reliability of eye-gaze detection data involves calculating a dispersion (variation) of eye-gaze position information of a plurality of latest frames of an object frame and adopting an inverse of the calculated dispersion as a reliability assessment value of the eye-gaze position information of the object frame. The smaller the dispersion, the smaller the variation, the more stable the value, and the higher the reliability, and the larger the dispersion, the larger the variation, the less stable the value, and the lower the reliability. Therefore, by adopting the inverse of dispersion as the reliability assessment value, reliability of eye-gaze position information can be appropriately assessed. Otherwise, since the longer the focal length, the more severe the blur of a subject being photographed due to the user's camera shake, the user is unable to correctly track eye-gaze information when tracking the blurred subject with an eye gaze and, therefore, reliability may be calculated by additionally taking the focal length into consideration. Specifically, assessments are to be made such that the shorter the focal length, the higher the reliability and the longer the focal length, the lower the reliability.

Furthermore, in addition to the above, the fact that reliability of eye-gaze information acquired from the eye-gaze detection sensor itself changes in accordance with a degree of opening of an eyelid may be additionally taken into consideration. The reason reliability of eye-gaze information changes in accordance with the degree of opening of an eyelid is that, in a similar manner to the reason that eye-gaze detection accuracy differs in accordance with eye-gaze position, a part of the pupil becomes hidden by the eyelid. The variation in reliability of eye-gaze information in accordance with the degree of opening of an eyelid can be acquired by the eye-gaze detection sensor. When the reliability of eye-gaze information in accordance with the degree of opening of an eyelid cannot be obtained by the eye-gaze detection sensor, reliability can be assessed by acquiring information on the degree of opening of an eyelid using a separate sensor.

In addition, a difference between eye-gaze positions or an average value of pupil diameters of a plurality of frames and the eye-gaze position or a pupil diameter of the present frame may be adopted as a reliability assessment value.

As the reliability determination threshold, a reliability assessment value may be calculated based on the eye-gaze position and the pupil diameter in various situations of a plurality of persons having been measured in advance and, based on the reliability assessment value, an appropriate value in accordance with the live view setting may be set in advance.

Jump Determination

The jump determination explained in S207 of FIG. 8 will be explained with reference to FIG. 11. In FIG. 11, an abscissa represents time and an ordinate represents a variation amount of the detected eye-gaze position, and Th3 denotes a jump determination threshold. J1 to J11 denote eye-gaze position variation amounts with respect to the respective frames. The variation amount of the eye-gaze position is an absolute value of a difference from the eye-gaze position of a reference frame and, in the present embodiment, an example which assumes a first frame to be the reference frame is shown in which J1=0. It should be noted that the reference frame may be a frame which precedes an object frame by a prescribed number of frames.

In the jump determination processing, a jump is determined to have occurred only when there are a prescribed number of consecutive frames (number of jump determination frames) of which a difference between the eye-gaze position in the reference frame and the eye-gaze position in the present frame is larger than a prescribed value (jump determination threshold). In the present embodiment, the number of jump determination frames N2 when the display setting of a pointer is off is smaller than the number of jump determination frames N1 when the display setting of a pointer is on (N1>N2).

In the processing of the eye-gaze position information in S208, post-processing eye-gaze position information is obtained without using eye-gaze positions prior to the occurrence of jump but only using eye-gaze positions after a latest frame subsequent to the occurrence of jump. Accordingly, when a jump occurs, the eye-gaze position after processing immediately matches a position after the jump. Therefore, the smaller the number of jump determination frames, the smaller the delay of movement to the jumped position. On the other hand, since an erroneous determination due to variation more readily occurs, visibility declines.

As shown in FIG. 11, since visibility is emphasized during pointer display, a jump is determined to have occurred when the difference exceeds the jump determination threshold for N1-number of consecutive frames (3 consecutive frames) in J4 to J6, and a jump is determined to have occurred in a frame corresponding to J6.

During pointer non-display, in order to reduce delay, a jump is determined to have occurred when the difference exceeds the jump determination threshold for N2-number of consecutive frames (2 consecutive frames) in J4 and 35 and a jump is determined to have occurred in a frame corresponding to J5.

While a jump is determined to have occurred when there are N1-number of consecutive frames (3 consecutive frames) during pointer display and N2-number of consecutive frames (2 consecutive frames) during pointer non-display in the present embodiment, the determination of a jump is not limited thereto and the number of consecutive frames for pointer non-display need only be smaller than the number of consecutive frames for pointer display. In addition, the frames need not necessarily be consecutive and a jump may be determined to have occurred when a prescribed percentage or more within a prescribed period are equal to or greater than the jump determination threshold.

Furthermore, while the reference frame which is used to obtain a difference therefrom is fixed in the present embodiment, the reference frame is not limited thereto and a frame preceding the present frame by a prescribed number of frames may be adopted as the reference frame.

In addition, when the eye-gaze position with poor reliability described above is included, a jump determination may be made by not including frame information of the eye-gaze position in the determination. In this case, with a determination based on the number of consecutive frames, a result of the frame with poor reliability is not taken into consideration but a next frame is to be counted as a consecutive frame as long as the frame exceeds the threshold. Furthermore, with a determination based on a percentage within a prescribed period, a percentage excluding the frame with poor reliability is calculated and determined or a percentage is calculated and determined by including another frame in place of the frame with poor reliability.

By switching between thresholds of jump determination in accordance with the live view setting in this manner, appropriate eye-gaze position information can be calculated for each of pointer display and pointer non-display.

Processing of Eye-Gaze Position Information

Figure 12:
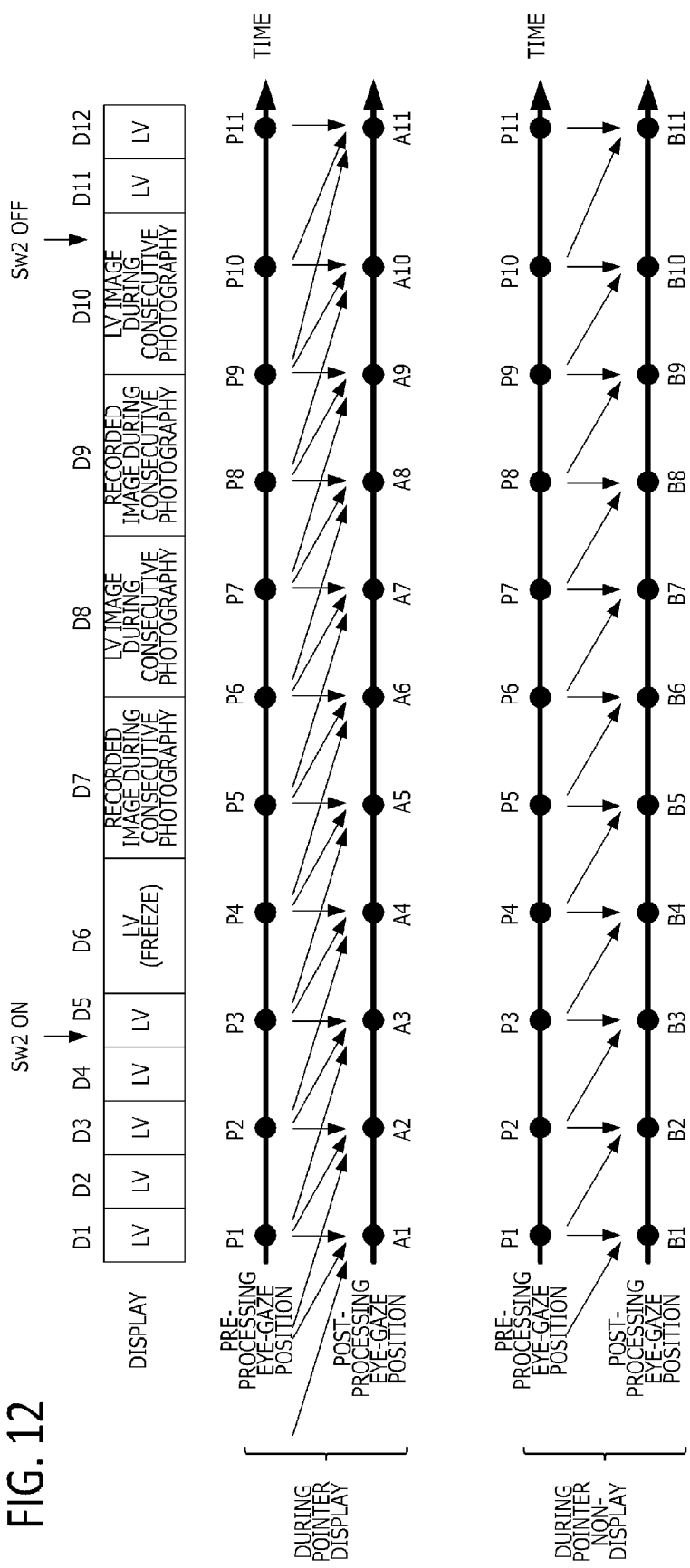
FIG. 12 is an example of a timing chart of eye-gaze detection and processing according to the embodiment.

Processing of a detected eye-gaze position will be explained with reference to FIGS. 12 to 14. FIG. 12 is an example of a timing chart of a live view display image, eye-gaze detection, and processing.

An upper part of FIG. 12 shows a type and a display period of live view display images above a timing chart. Images to be displayed are denoted by suffixes D1 to D12. D1 to D5 denote live view displays (LV) started in S3 in FIG. 6. The live view displays are updated at, for example, 60 fps. While D5 is being displayed, an on state of the second shutter switch signal SW2 is detected, the processing is advanced to S10 in FIG. 6 and, subsequently, display of the recorded image (D7 and D9) acquired in S300 and display of the image for detection and display (D8 and D10) acquired in S400 are alternately performed. Since displaying the recorded image requires time as described above, display of the live view display image D6 is not updated (frozen) and a display period has been extended. While D10 is being displayed, off of the second shutter switch signal SW2 is detected, and a return is made to the live view display (D1 and D12) started in S3 in FIG. 6.

A middle part of FIG. 12 is a diagram explaining processing of an eye-gaze position during pointer display and shows an eye-gaze detection timing (acquisition timing of a pre-processing eye-gaze position) and an acquisition timing of a post-processing eye-gaze position. As the eye-gaze detection timings in the middle part of FIG. 12, with respect to the display periods and display update timings of the display images in the upper part, timings at which an eye-gaze position is detected are indicated by black circles (P1 to P11). The detection of an eye-gaze position is performed by the eye-gaze input operation portion 701 and the drawing shows that the detection of an eye-gaze position is performed at 30 fps in parallel to an imaging operation (P1 to P10).

The detection of an eye-gaze position is performed at a constant detection rate regardless of whether or not consecutive photography is being performed. At P11, since synchronization processing of an eye-gaze acquisition timing is performed with respect to the display image of D12 after consecutive photography is completed, the detection interval (from P10 to P11) differs from other detection intervals.

Acquisition timings of post-processing eye-gaze positions in the middle part of FIG. 12 represent timings of acquiring a result (post-processing eye-gaze position information) after processing of an eye-gaze position during pointer display. It is shown that the processed eye-gaze position information obtained at the timings of A1 to A11 are calculated using information on detected eye-gaze positions corresponding to N3-number of frames (three frames). For example, the processed eye-gaze position information obtained at the timing of A4 is positional information obtained by averaging processing of eye-gaze positions obtained at the timings of P2, P3, and P4. As described earlier, since visibility is emphasized during pointer display, processing such as averaging processing is performed using a larger number of frames than during pointer non-display. Accordingly, visibility can be increased.

A lower part of FIG. 12 is a diagram explaining processing during pointer non-display and shows an eye-gaze detection timing and an acquisition timing of a post-processing eye-gaze position. As the eye-gaze detection timings in the lower part of FIG. 12, with respect to the display periods and display update timings of the display images in the upper part, timings at which an eye-gaze position is detected are indicated by black circles (P1 to P11). The detection of an eye-gaze position is performed by the eye-gaze input operation portion 701 and the drawing shows that the detection of an eye-gaze position is performed at 30 fps in parallel to an imaging operation (P1 to P10). The detection of an eye-gaze position is performed at a constant detection rate regardless of whether or not consecutive photography is being performed. At P11, since synchronization processing of an eye-gaze acquisition timing is performed with respect to the display image of D12 after consecutive photography is completed, the detection interval (from P10 to P11) differs from other detection intervals.

Acquisition timings of processed eye-gaze positions in the lower part of FIG. 12 represent timings of acquiring a result (post-processing eye-gaze position information) after processing of an eye-gaze position during pointer non-display. Unlike the eye-gaze position information during pointer display described earlier, the lower part of FIG. 12 shows that the post-processing eye-gaze position information are calculated using information on detected eye-gaze positions corresponding to N4-number of frames (two frames). For example, the post-processing eye-gaze position information obtained at the timing of B4 is positional information obtained by averaging processing of eye-gaze positions obtained at the timings of P3 and P4 which is fewer than the pieces of eye-gaze position information during pointer display described earlier. As described earlier, since reducing the effect of delay is emphasized during pointer non-display, processing such as averaging processing is performed using a smaller number of frames than during pointer display. Accordingly, the effect of delay can be reduced.

In the present embodiment, the system control portion 50 calculates a post-processing eye-gaze position based on a plurality of pre-processing eye-gaze positions and, when the pointer display setting is off, a post-processing eye-gaze position is calculated using a smaller number of pre-processing eye-gaze positions than when the display setting is on. While the number of averaging frames N3 during pointer display is three frames and the number of averaging frames N2 during pointer non-display is two frames in the present embodiment, the respective numbers of frames are not limited to these values. Specific values are not particularly limited as long as the number of averaging frames N4 during pointer non-display is smaller than the number of averaging frames N3 during pointer display (N3>N4).

While the averaging processing as processing performed in FIG. 12 has been explained with reference to a case where eye-gaze position information used in the processing is simply averaged, weighted averaging processing may be performed instead. With simple averaging processing, when the number of pieces of used eye-gaze position information is increased, a temporal delay of information on detected positions increases. Therefore, by reducing a weight of older information, the temporal delay can be prevented from increasing. In doing so, the degrees of weighting and the number of pieces of used positional information may conceivably be changed between during pointer display and during pointer non-display.

During pointer non-display, by performing processing using a smaller number of pieces of positional information and increasing weight of temporally close information, emphasis may be placed on reducing the effect of delay. On the other hand, during pointer display, by performing processing using a larger number of pieces of positional information and increasing weight of older information, processing which emphasizes visibility can be performed. In other words, when the display setting of a pointer is off, the system control portion 50 calculates a post-processing eye-gaze position by performing weighted-averaging of a plurality of pre-processing eye-gaze positions by increasing the weight of a frame being temporally close to the present frame relative to the pre-processing eye-gaze position as compared to when the display setting is on.

Next, an example of a case where eye-gaze position information of which reliability is determined to be poor in the reliability determination of S206 is present will be explained with reference to FIG. 13. While a post-processing eye-gaze position is obtained by averaging eye-gaze positions of a prescribed number of latest frames (number of averaging frames) in the present embodiment, averaging processing is performed without using an eye-gaze position of which reliability is determined to be poor among the eye-gaze positions.

Figure 13:
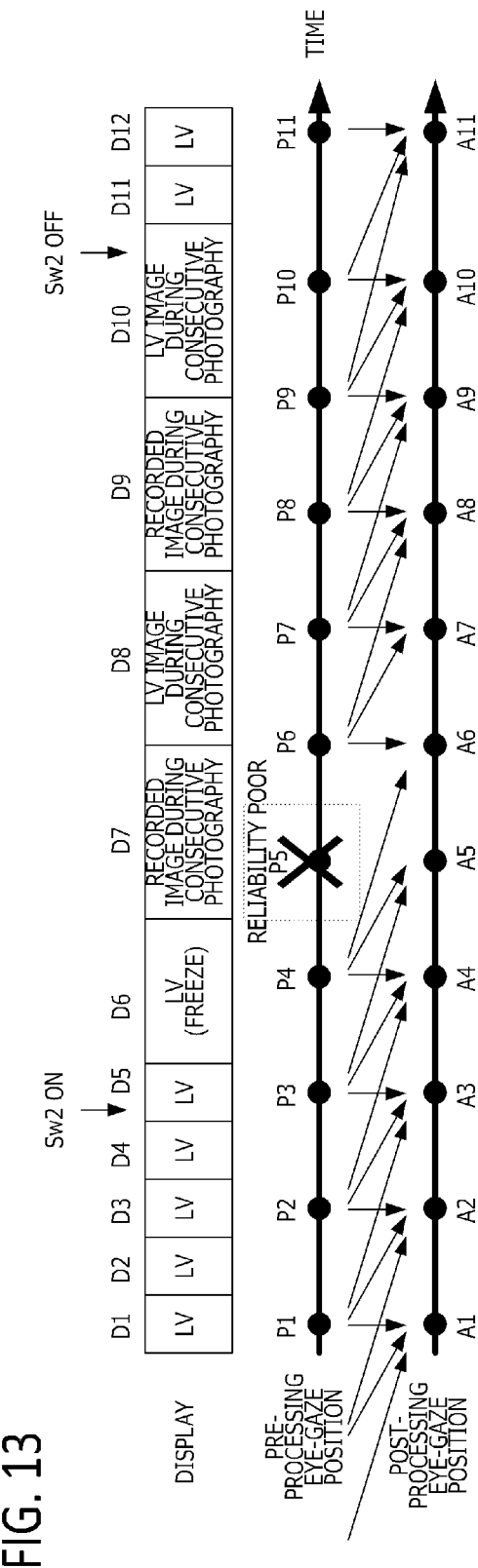
FIG. 13 is an example of a timing chart of eye-gaze detection and processing according to the embodiment.

FIG. 13 is an example of a timing chart of a live view display image, eye-gaze detection, and processing in a similar manner to FIG. 12. P1 to P4, P6 to P11, A1 to A4, and A8 to A11 in FIG. 13 denote the same diagrams as in FIG. 12. The difference from FIG. 12 is in the fact that the reliability of P5 in FIG. 13 has been determined to be poor and, accordingly, in a calculation method of post-processing eye-gaze positions of A5 to A7.

The calculation method of post-processing eye-gaze positions of A5 to A7 in FIG. 13 will be explained. In the present embodiment, a post-processing eye-gaze position is calculated without using pre-processing eye-gaze positions determined to be unreliable and only using pre-processing eye-gaze positions determined to be reliable. Although processing such as averaging is performed including the eye-gaze position of P5 when calculating A5 to A7 since P5 had been determined to be reliable in FIG. 12, in FIG. 13, processing such as averaging is performed without including the eye-gaze position of P5 since P5 had been determined to be unreliable. Specifically, A5 is calculated by averaging processing of P3 and P4, A6 is calculated by averaging processing of P4 and P6, and A7 is calculated by averaging processing of P6 and P7. Since averaging using an eye-gaze position of which reliability is poor may possibly result in performing processing including positional information which significantly deviates due to variation, processing is performed by excluding eye-gaze positions of which reliability is poor.

When an eye-gaze position of which reliability is poor is present, the effect of an delay due to processing may become significant. For example, when reliability is determined to be poor at P5, since A5 is obtained as an average of P3 and P4, A5 ends up being a position which strongly reflects previous eye-gaze positions as compared to a case where A5 is obtained as an average of P3 to P5. In consideration thereof, in the present embodiment, a value of the reliability determination threshold is changed in accordance with the display setting of a pointer, and by setting a lenient reliability determination threshold when the setting is pointer non-display, processing which emphasizes reducing delay is performed.

Next, an example of a case where eye-gaze position information of which a jump is determined in the jump determination of S207 is present will be explained with reference to FIG. 14. While a post-processing eye-gaze position is obtained by averaging eye-gaze positions of a prescribed number of latest frames (number of averaging frames) in the present embodiment, averaging processing is performed without using eye-gaze positions which precede a latest occurrence of a jump among the eye-gaze positions.

Figure 14:
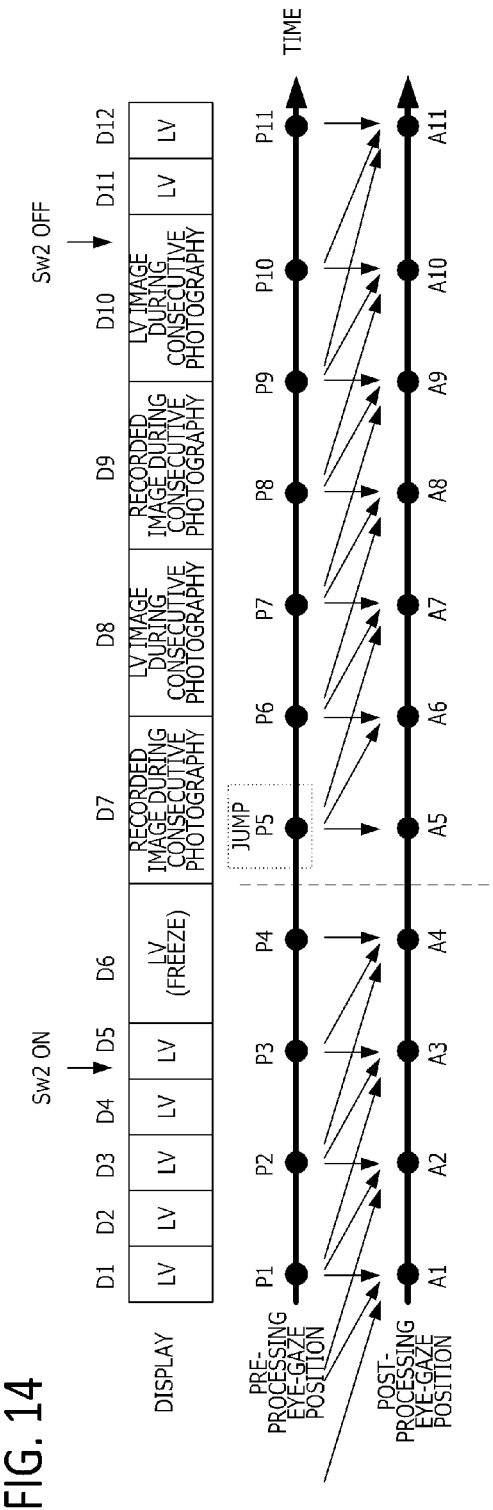
FIG. 14 is an example of a timing chart of eye-gaze detection and processing according to the embodiment.

FIG. 14 is an example of a timing chart of a live view display image, eye-gaze detection, and processing in a similar manner to FIG. 13. P1 to P4, P6 to P11, A1 to A4, and A7 to A11 in FIG. 14 denote the same diagrams as in FIG. 12. The difference from FIG. 12 is in the fact that P5 in FIG. 14 is determined to have jumped and, accordingly, in a calculation method of processed eye-gaze positions of A5 and A6.

The calculation method of processed eye-gaze positions of A5 and A6 in FIG. 14 will be explained. While processing such as averaging is performed including the eye-gaze positions at time points preceding P5 when calculating A5 and A6 in FIG. 12, in FIG. 13, since P5 is determined to have jumped, processing such as averaging is performed without including the eye-gaze positions of time points preceding P5. Specifically, a position of P5 is output without modification as A5 while A6 is calculated by averaging processing of P5 and P6. Since averaging using an eye-gaze position which precedes the time point of a jump is drawn toward the position preceding the jump and prevents immediate movement, processing is performed by excluding eye-gaze positions preceding the time point where a jump is determined to have occurred.

It should be noted that obtaining a post-processing eye-gaze position using an eye-gaze position after the time point where a jump is determined to have occurred enables an effect of delay to be reduced. In consideration thereof, in the present embodiment, a value of the number of jump determination frames is changed in accordance with the display setting of a pointer, and by setting lenient conditions under which an occurrence of a jump is determined when the setting is pointer non-display, processing which emphasizes reducing delay is performed.

The averaging processing and the decimation processing explained with reference to FIGS. 12, 13, and 14 can be considered to be weighting processing in a broad sense. Uniformly weighting pieces of data to be used in the processing corresponds to averaging processing while assigning zero weight to a given piece of data corresponds to decimation processing. In addition, a difference between when the display setting is on and when the display setting is off in the processing explained above can be specified as follows. Specifically, the processing according to the present embodiment when a pre-processing eye-gaze position of a same time-series is to be used as a processing object is processing for obtaining a post-processing eye-gaze position so that a change in the post-processing eye-gaze position is smoother when the display setting is on as compared to when the display setting is off.

In addition, while an eye-gaze position is obtained by processing pre-processing eye-gaze positions in the present embodiment, a range having a certain width may be obtained instead. For example, the processing may obtain a range which has a prescribed size and which is centered on a center of gravity point of a plurality of pre-processing eye-gaze positions as a post-processing eye-gaze region (second eye-gaze information).

While photographing conditions affected by delay have been explained as an accommodation when the setting is pointer non-display, situations affected by delay are not limited thereto. Contents of processing of eye-gaze positions may be switched as described above between an operating mode (a first operating mode) which is hardly affected by delay and an operating mode (a second operating mode) in which the effect of delay due to processing of eye-gaze positions should be reduced in accordance with an operating mode other than the display setting of a pointer. In the description given above, the case where the display setting of a pointer is on corresponds to the first operating mode and the case where the display setting of a pointer is off corresponds to the second operating mode.

Another example of the second operating mode is a mode of photographing a high-speed subject and an example of the first operating mode is a mode other than the second operating mode. Specific examples of a mode of photographing a high-speed subject include a preset photography mode for sports and a shutter speed priority mode in which a shutter speed is set shorter than a threshold. When the photographer has set the photography mode to a mode of photographing a high-speed subject, it is conceivably likely that the photographer will perform a determination operation before checking that the pointer has reached the subject position. Even in such cases, it is effective to calculate a post-processing eye-gaze position by a calculation method which reduces the effect of delay than usual as described in the processing during a non-display setting.

In addition, a camera setting may be configured such that which of delay suppression and visibility is to be prioritized by the photographer can be set as an operating mode and the calculation method of a processed eye-gaze position may be changed in accordance with the operating mode setting. A mode prioritizing visibility corresponds to the first operating mode and a mode prioritizing delay suppression corresponds to the second operating mode. Alternatively, the setting may be configured so as to be settable in several stages.

Focus Detection Region Setting

Setting of a focus detection region using eye-gaze position information in S6 in FIG. 6 will be explained with reference to FIGS. 15A and 15B. The focus detection region is set based on a post-processing eye-gaze position at a time point where the first shutter switch (Sw1) 62 is pressed. Therefore, Sw1 corresponds to accepting means which accepts a determination operation for determining input of an eye-gaze position for setting the focus detection region. In addition, the system control portion 50 corresponds to processing means which performs processing based on post-processing eye-gaze information (second eye-gaze information) at a time point where the determination operation is accepted.

Figure 15A:
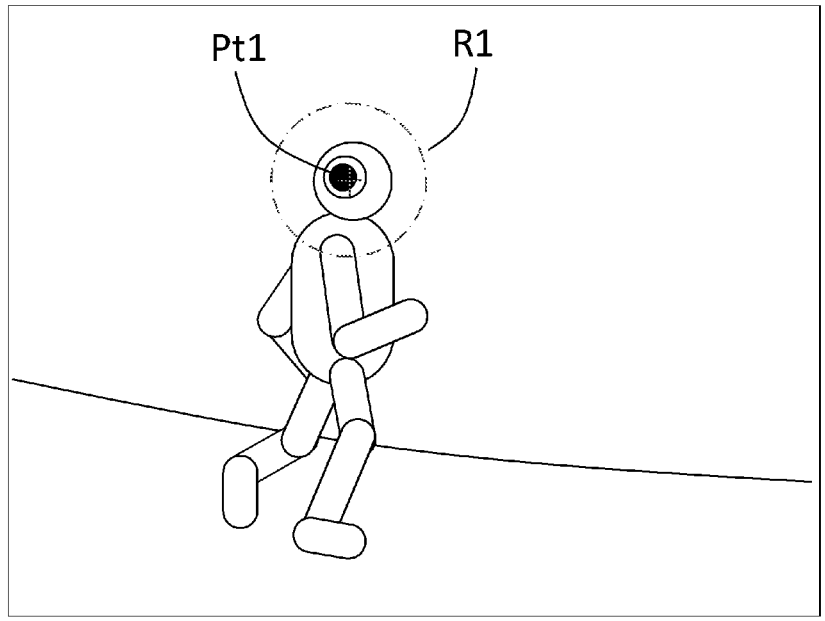
FIGS. 15A and 15B are diagrams for explaining a setting range of a focus detection region according to the embodiment.
Figure 15B:
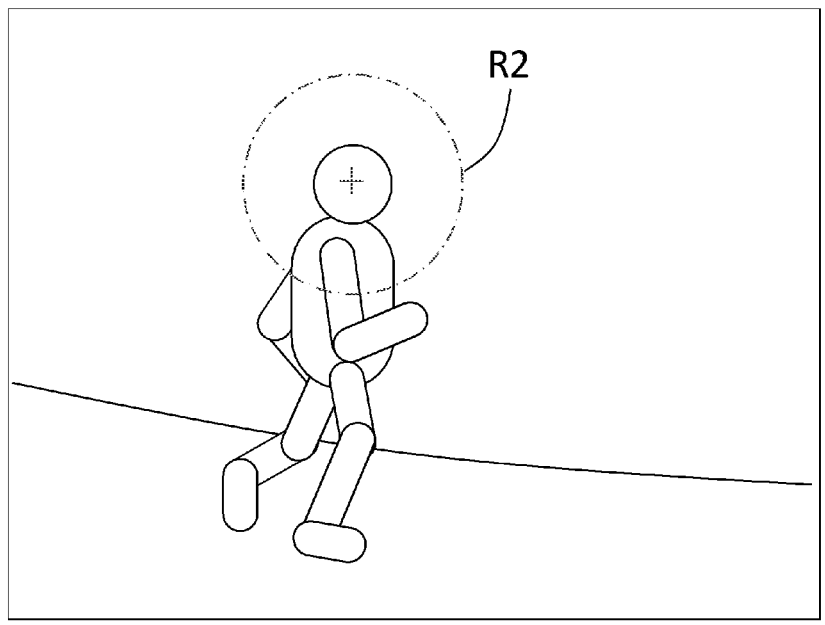

FIG. 15A is an explanatory diagram for explaining a search range (setting range) of a focus detection region during pointer display and FIG. 15B is an explanatory diagram for explaining a search range (setting range) of a focus detection region during pointer non-display. R1 in FIG. 15A denotes a search range of a focus detection region during pointer display and R2 denotes a search range of a focus detection region during pointer non-display. Pt 1 denotes a pointer indicating an eye-gaze position which is displayed during pointer display. With a range corresponding to the post-processing eye-gaze position (hereinafter, also referred to as a determined position) at a time point where the photographer had pressed Sw1 as an object, the system control portion 50 determines which region is to be adopted as a focus detection region.

During pointer display, since it is likely that the photographer will execute a determination operation after checking that the pointer has reached the subject as described above, an amount of deviation between the subject position which the photographer wishes to bring into focus and the post-processing eye-gaze position after determination is small. Therefore, the search range of the focus detection region is set to a range R1 in a vicinity of the determined position. While the range R1 is assumed to be a circle with a radius r1 centered on the determined position in the present embodiment, the search range is not limited to a circle and may have another shape such as a rectangle. The system control portion 50 performs ranging with respect to the range R1 and sets a nearest ranging point at which a defocus amount is being detected in the range R1 as the focus detection region. While a nearest ranging point at which a defocus amount is being detected is set as the focus detection region in the present embodiment, the focus detection region is not limited thereto. A ranging point belonging to a modal class of a defocus histogram calculated by classifying defocus amounts in the range R1 into classes may be set as the focus detection region.

On the other hand, since a pointer is not displayed when the display setting is pointer non-display and the photographer is likely to execute a determination operation as soon as the subject comes into view, an amount of deviation between the subject position and the determined position tends to be large. Therefore, in consideration of the possibility that the determined position may be deviated, the search range of the focus detection region is set to a range R2 which is wider than during pointer display. In the present embodiment, the range R2 is a circle with a radius r2 centered on the determined position, the radius r2 being larger than the radius r1. In other words, the object range in which focus detection is to be performed is set larger when the display setting of a pointer is off as compared to when the display setting of a pointer is on.

By switching setting ranges of a focus detection region between displaying and not displaying a pointer in this manner, a focus detection region can be set in consideration of a deviability of a determined position.

In addition, the focus detection region may be set to a subject region detected by eye-gaze position information. In this case, a search range of a subject detection region may be switched between displaying and not displaying a pointer instead of switching the search range of a focus detection region as described above. In this case, during pointer display, only a subject within the range R1 is detected, and once a subject is detected, the subject detection region is set as the focus detection region. During pointer non-display, similar processing is performed by replacing the range R1 with the range R2. As described above, by switching search ranges of a subject detection region between displaying and not displaying a pointer in this manner, a subject detection region can be set in consideration of a deviability of a determined position.

OPERATION EXAMPLES

An operation of the imaging apparatus according to the present embodiment will be explained using specific examples.

Figure 18:
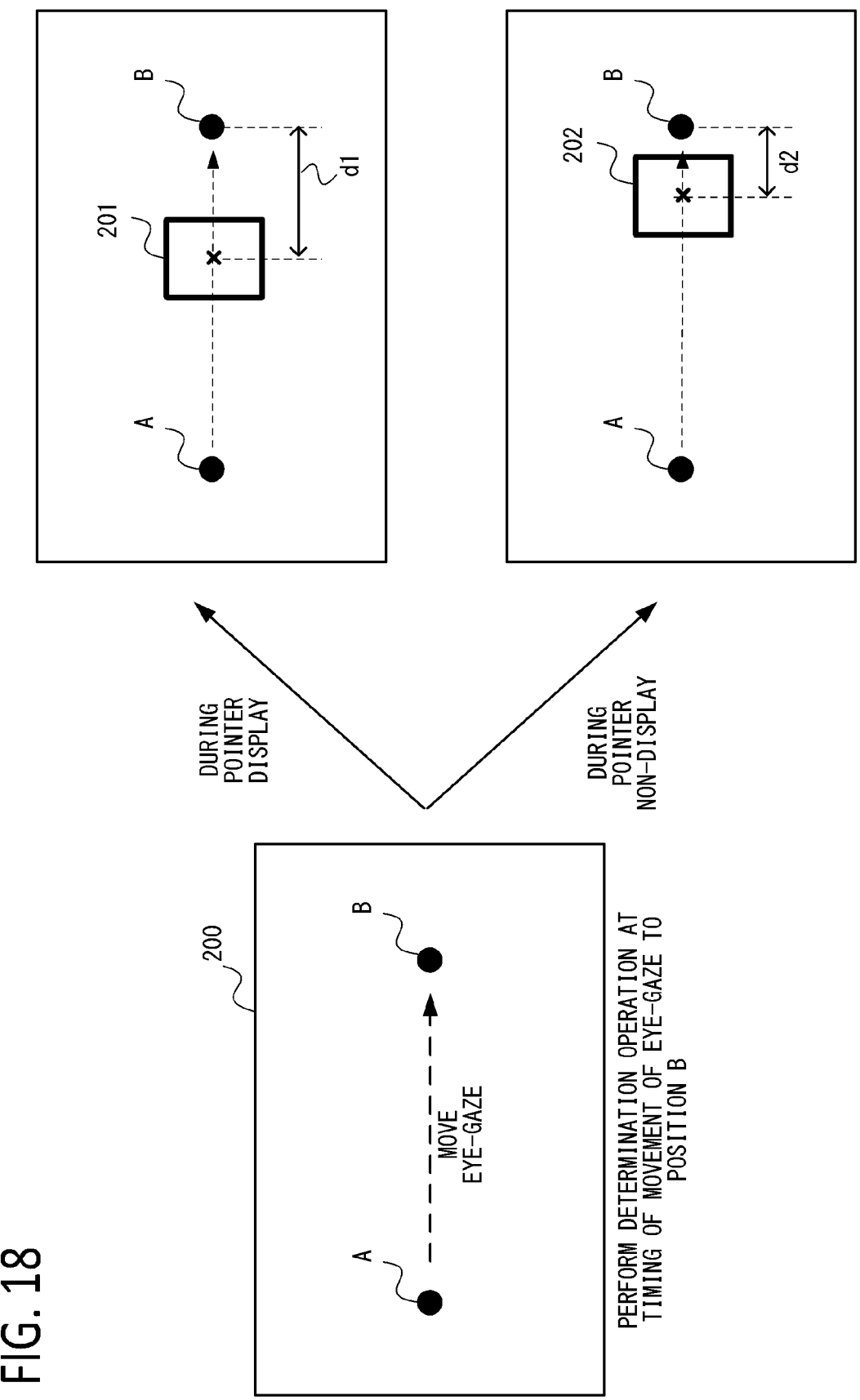
FIG. 18 is a diagram for explaining an operation example of the imaging apparatus according to the embodiment.

FIG. 18 is a diagram illustrating a first operation example. In the present operation example, an example of displaying an AF frame at an eye-gaze position of the photographer and a position based on a determination operation will be described. The present operation example assumes a case where subject detection is off(disabled) or a case where a subject that can be detected is not present even when subject detection is on (enabled). In these cases, a region set based on the eye-gaze position at a time point where a determination operation is performed is a focus detection region and an AF frame (focus detection frame) indicating the focus detection region is displayed on the display portion 28.

Reference numeral 200 denotes a display region of the display portion 28. The photographer moves an eye-gaze position from a position A to a position B and performs a determination operation (Sw1) at a timing where the movement of the eye-gaze position to the position B has been completed. In response to the determination operation, the system control portion 50 sets the focus detection region based on a post-processing eye-gaze position of the timing at which the determination operation had been performed and displays an AF frame indicating the set focus detection region on the display portion 28. In this case, since it is assumed that subject detection is off or a subject that can be detected is not present even when subject detection is on, the AF frame is set at a position centered on the post-processing eye-gaze position. Reference numeral 201 denotes an AF frame which is displayed when pointer display is on and reference numeral 202 denotes an AF frame which is displayed when pointer display is off. As illustrated, a distance d2 between the AF frame 202 and the position B when the display setting of a pointer is off is smaller than a distance d1 between the AF frame 201 and the position B w % ben the display setting of a pointer is on. In other words, the AF frame 202 is displayed closer to the position B than the AF frame 201.

The AF frame 202 being displayed closer to the position B than the AF frame 201 is mainly attributable to the fact that the number of averaging frames N4 during pointer non-display is smaller than the number of averaging frames N3 during pointer display. It is assumed that a reliability determination results in a determination of reliable in both cases and that, in a jump determination, a determination that a jump has not occurred is not made in both cases. Since a post-processing eye-gaze position is obtained based on pre-processing eye-gaze positions in more recent frames during pointer non-display, an error between an actual eye-gaze position and the post-processing eye-gaze position is reduced at a timing where a determination operation is performed. In this manner, the effect of delay is reduced in processing of an eye-gaze position during pointer non-display.

When the photographer increases a movement speed by which an eye-gaze position is moved from the position A to the position B midway through the movement, a difference between d1 and d2 increases as compared to moving the eye-gaze position at a constant speed. More specifically, when comparing a case where the speed at which the photographer moves the eye-gaze position from the position A to the position B is a first speed (approximately constant speed) with a case where the photographer starts moving the eye-gaze position from the position A to the position B at the first speed but then changes the speed to a second speed which is higher than the first speed, the difference between d1 and d2 in the latter case is larger than in the former case. This is attributable to the fact that the number of averaging frames N4 during pointer non-display is smaller than the number of averaging frames N3 during pointer display. The change from the first speed to the second speed may be performed gradually, switched instantaneously, switched in stages, or a combination thereof.

Figure 19A:
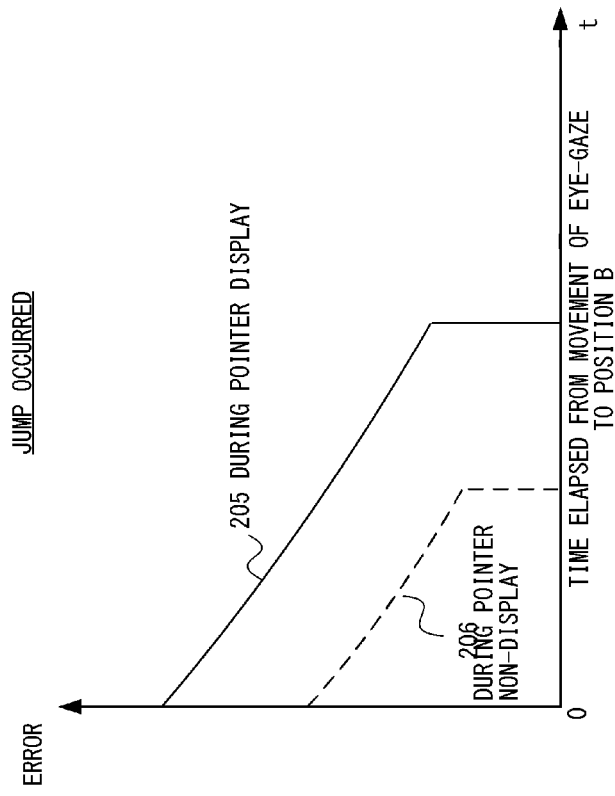
FIGS. 19A and 19B are diagrams for explaining an operation example of the imaging apparatus according to the embodiment.
Figure 19B:
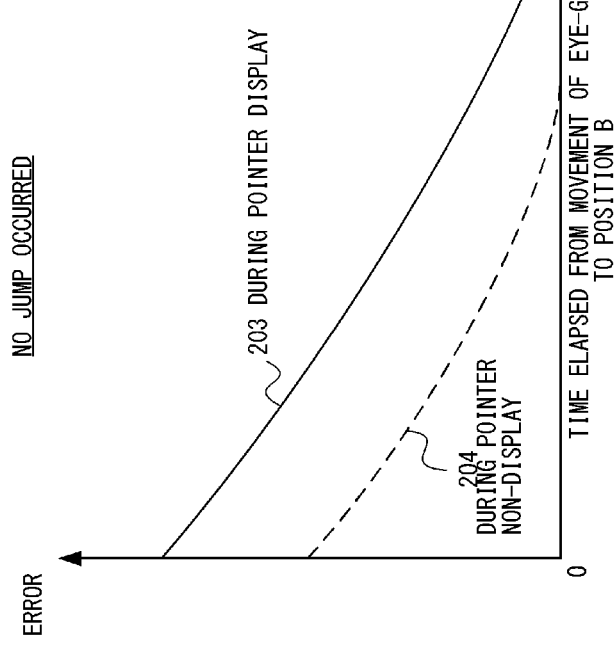

FIGS. 19A and 19B are diagrams illustrating a second operation example.

While the photographer performs a determination operation immediately after moving an eye gaze to the position B in the description given above, in the present operation example, a determination operation is performed after a time t elapses from the movement of the eye gaze to the position B. FIGS. 19A and 19B are graphs showing a relationship between time t and an error between a focus detection region (AF frame) and the position B.

FIG. 19A shows an example of a case where an eye-gaze position is moved from the position A to the position B at an eye-gaze movement speed not high enough to result in a positive jump determination. A graph 203 indicates a relationship between time t and the error during pointer display and a graph 204 indicates a relationship between time t and the error during pointer non-display. As described above, when a determination operation is performed immediately after moving an eye gaze to the position B (when t=0), the error is smaller during pointer non-display than during pointer display. In addition, time required for the error to become 0 or fall below a prescribed value is also shorter during pointer non-display than during pointer display. This is attributable to the fact that the number of averaging frames during pointer non-display is smaller than the number of averaging frames during pointer display.

FIG. 19B shows an example of a case where an eye-gaze is moved from the position A to the position B in one go (at an eye-gaze movement speed high enough to result in a positive jump determination). While both a graph 205 during pointer display and a graph 206 during pointer non-display are similar to FIG. 19A when elapsed time is short, error is reduced (to approximately zero) at a timing where a positive jump determination is made. In addition, an elapsed time t until the error decreases is shorter during pointer non-display than during pointer display. This is attributable to the fact that the number of jump determination frames N2 during pointer non-display is smaller than the number of jump determination frames N1 during pointer display.

It should be noted that the first operation example and the second operation example described above assume an environment in which a subject is present at a same distance as a whole in the vicinity of the position B and in which the focus detection region (AF frame) does not deviate from the post-processing eye-gaze position during a determination operation.

A third operation example relates to subject detection and, in the present operation example, a subject is selected from an eye-gaze position of a photographer and a position based on a determination operation and display to that effect is performed. More specifically, a subject is detected from a periphery of the eye-gaze position and a frame indicating the detected subject region is displayed on the display portion. In this case, a situation is assumed in which a relatively small subject is present and eye contact is established with a position that is separated from the subject position. Since the eye-gaze position is separated from the subject position, whether or not a region in which the subject is actually present can be detected as a subject region depends on a distance between the eye-gaze position and the subject position.

For example, a maximum distance (an amount of positional displacement) at which the subject region can be correctly detected can be obtained by determining whether or not the subject region can be correctly detected while changing a distance d between the eye-gaze position and the subject position. In the present embodiment, a maximum value of a positional displacement amount that is allowed for a region in which the subject is actually present to be correctly detected (selected) as a subject region is larger during pointer non-display than during pointer display. This is because a larger search range of a subject detection region is set to perform subject detection during pointer non-display than during pointer display. When a positional displacement amount between the eye-gaze position and the subject exceeds the maximum value of a positional displacement amount that is allowed for a subject region to be correctly detected, an AF frame is displayed at position based on an eye-gaze position of a photographer and a position based on a determination operation as explained in the first operation example.

A fourth operation example relates to an operation involving setting a focus detection region from a periphery of an eye-gaze position and determining an in-focus position from the focus detection region. In this case, a situation is assumed in which a relatively small subject is present and eye contact is to be established with a position that is separated from a position (target position) which the photographer wishes to bring into focus. When the in-focus position is determined as a nearest position to the subject, the target position may be set to the nearest position to the subject. Since the eye-gaze position is separated from the target position, whether or not the target position can actually be brought into focus depends on a distance between the eye-gaze position and the target position.

For example, a maximum distance (an amount of positional displacement) at which the target position can be brought into focus can be obtained by determining whether or not the target position has been brought into focus while changing a distance d between the eye-gaze position and the target position. In the present embodiment, a maximum value of a positional displacement amount that is allowed in order to bring the target position into focus is larger during pointer non-display than during pointer display. This is because a larger search range (ranging region) of a focus detection region is set to perform focus detection during pointer non-display than during pointer display.

Modifications

In the embodiment described above, all of a reliability determination threshold, the number of jump determination frames, and the number of averaging frames differ between when the display setting of a pointer is on and when the display setting of a pointer is off. However, in other embodiments, only one or two of the reliability determination threshold, the number of jump determination frames, and the number of averaging frames may differ between when the display setting is on and when the display setting is off. In addition, a specific method of differentiating processing between when the display setting of a pointer is on and when the display setting of a pointer is off is not particularly limited as long as a post-processing eye-gaze position is smoother when the display setting is on and an effect of delay due to processing is smaller when the display setting is off.

In addition, while a center position of a focus detection region or a subject detection region is set to an eye-gaze position after processing having been acquired at a timing where the photographer had performed a determination operation in the embodiment described above, the center position may be set to an eye-gaze position after processing having been obtained using the eye-gaze position after the determination operation. For example, during pointer non-display, in consideration of an effect of delay, an eye-gaze position after processing having been acquired at a timing a prescribed amount of time after a timing where the determination operation had been performed may be set as the center position of a focus detection region or a subject detection region. In this manner, by setting a focus detection region or a subject detection region based on eye-gaze information at a timing after a prescribed amount of time enables the effect of delay due to processing to be reduced.

While the focus detection region (ranging region) and the subject detection region have been described to be determined based on a post-processing eye-gaze position (second eye-gaze information) in the description given above, the regions can also be considered to be determined based on a plurality of pieces of pre-processing eye-gaze position (first eye-gaze information). In other words, the focus detection region and the subject detection region can also be considered a region (second eye-gaze information) to be determined from a plurality of pieces of pre-processing eye-gaze position (first eye-gaze information).

Examples of Application to Other Electronic Devices

The present invention can be applied to any apparatus as long as the apparatus performs eye-gaze detection and processing according to an eye-gaze position. In particular, an apparatus to which the present invention can be applied is not particularly limited as long as the apparatus enables display of a pointer representing an eye-gaze position to be set to on or off and enables processing to be applied to a region of an image which corresponds to an eye-gaze position in a determination operation such as a key operation or a button operation.

Figure 20A:
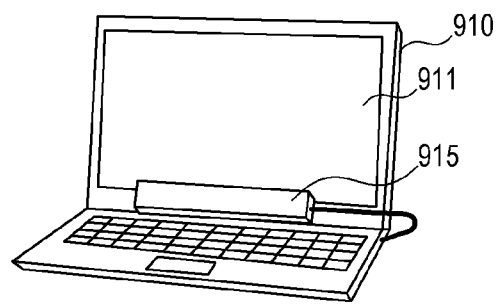
FIGS. 20A to 20C are diagrams for explaining other electronic devices capable of accepting eye-gaze input.

FIG. 20A is an external view of a notebook personal computer 910 (notebook PC) to which the present invention is applied. In FIG. 20A, an imaging unit 915 which images a user viewing a display portion 911 of the notebook PC 910 is connected to the notebook PC 910 and the notebook PC 910 acquires an imaging result from the imaging unit 915. In addition, the notebook PC 910 detects an eye gaze of a user based on the imaging result and changes a screen display in accordance with a result of the user reading a screen being displayed on the display portion 911. The electronic device to which the present invention is applied may have an interface which accepts a result of eye-gaze detection as an eye-gaze input and the eye-gaze detection may be performed by an external device. In other words, the imaging unit 915 may perform eye-gaze detection and the notebook PC 910 may acquire a result of the eye-gaze detection from the imaging unit 915.

Figure 20B:
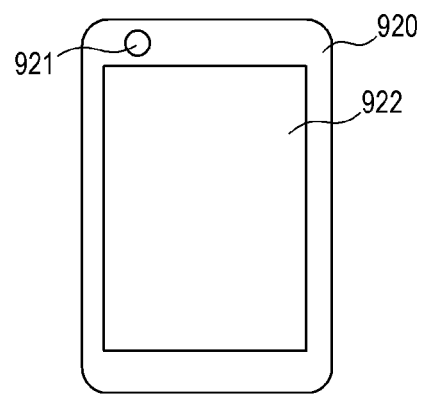

FIG. 20B is an external view of a smartphone 920 to which the present invention is applied. In FIG. 20B, the smartphone 920 detects an eye gaze of a user based on an imaging result of an in-camera 921 (front camera) and changes a screen display in accordance with a result of the user reading a screen being displayed on a display portion 922.

Figure 20C:
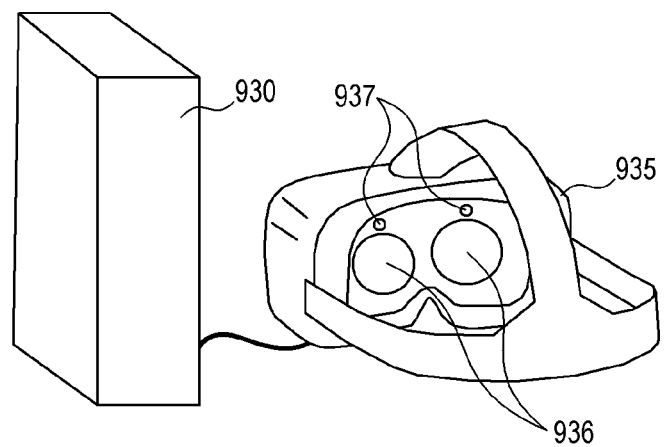

FIG. 20C is an external view of a game device 930 to which the present invention is applied. In FIG. 20C, a head mounted display 935 (HMD) which displays a VR (Virtual Reality) image of a game is connected to the game device 930. The HMD 935 has a camera 937 which images an eye of a user wearing the HMD 935 and the game device 930 acquires an imaging result from the HMD 935. In addition, the game device 930 detects an eye gaze of the user based on the imaging result and changes a screen display in accordance with a result of the user reading a screen (a part of the VR image) being displayed on a display portion 936 of the HMD 935. In a similar manner to the present invention being applicable to changing a screen displayed on the HMD, the present invention can also be applied to changing a screen (a part of an AR (Augmented Reality) image) to be displayed on a lens portion of an eyeglass-type wearable terminal or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-77440, filed on Apr. 30, 2021, which is hereby incorporated by reference herein in its entirety.

What is claimed is:

1. An eye-gaze information acquiring apparatus comprising at least one memory and at least one processor which function as:
    a first acquiring unit configured to acquire first eye-gaze information of an observer who observes display unit displaying an image;
    a pointer display unit configured to display a pointer indicating an eye-gaze position of the observer on the display unit when a display setting is set to on; and
    a second acquiring unit configured to acquire second eye-gaze information, based on the first eye-gaze information, wherein
    the second acquiring unit acquires the second eye-gaze information by a different method depending on the display setting of the pointer.

2. The eye-gaze information acquiring apparatus according to claim 1, wherein the second acquiring unit calculates the second eye-gaze information by using a plurality of pieces of the first eye-gaze information, and when the display setting is off, the second acquiring unit calculates the second eye-gaze information by using a smaller number of pieces of the first eye-gaze information than when the display setting is on.

3. The eye-gaze information acquiring apparatus according to claim 1, wherein the second acquiring unit calculates the second eye-gaze information by subjecting a plurality of pieces of the first eye-gaze information to weighted-averaging, and when the display setting is off, the second acquiring unit increases a weight with respect to the first eye-gaze information which is temporally close, as compared to when the display setting is on.

4. The eye-gaze information acquiring apparatus according to claim 1, wherein when the display setting is on, the second acquiring unit acquires the second eye-gaze information so that a temporal change of the second eye-gaze information is smoother than when the display setting is off.

5. The eye-gaze information acquiring apparatus according to claim 1, further comprising a first determining unit configured to determine whether or not the first eye-gaze information is reliable, wherein
    the second acquiring unit acquires the second eye-gaze information by using the first eye-gaze information having been determined to be reliable, and
    the first determining unit performs the determination by using a stricter determination threshold when the display setting is on than when the display setting is off.

6. The eye-gaze information acquiring apparatus according to claim 1, further comprising a second determining unit configured to determine whether or not a jump of the first eye-gaze information has occurred, wherein
    the second acquiring unit acquires the second eye-gaze information by using the first eye-gaze information subsequent to a latest frame of an occurrence of a jump,
    the second determining unit determines that the jump has occurred only when there are a prescribed rate or more of frames, within a prescribed period, having a difference between the first eye-gaze information in a reference frame and the first eye-gaze information in a present frame, the difference being larger than a prescribed value, and
    the prescribed rate is smaller when the display setting is off than when the display setting is on.

7. The eye-gaze information acquiring apparatus according to claim 1, wherein the second eye-gaze information is a position or a range.

8. The eye-gaze information acquiring apparatus according to claim 1, wherein the pointer display unit displays the pointer at a position or in a region which corresponds to the second eye-gaze information.

9. The eye-gaze information acquiring apparatus according to claim 1, further comprising:
    an accepting unit configured to accept a determination operation by the observer; and
    a processing unit configured to perform processing based on the second eye-gaze information at a time point where the determination operation has been accepted.

10. The eye-gaze information acquiring apparatus according to claim 9, wherein the processing unit performs focus detection or subject detection, with a range that corresponds to the second eye-gaze information being an object.

11. The eye-gaze information acquiring apparatus according to claim 10, wherein the range that corresponds to the second eye-gaze information is larger when the display setting is off than when the display setting is on.

12. An eye-gaze information acquiring apparatus comprising at least one memory and at least one processor which function as:

a processing unit configured to display a frame, based on eye-gaze information of an observer observing display unit displaying an image and a determination operation by the observer; and a pointer display unit configured to display a pointer indicating an eye-gaze position of the observer on the display unit when a display setting is set to on, wherein when the observer moves an eye-gaze position from a first position to a second position and performs the determination operation at a timing where the eye-gaze position has moved to the second position, a distance between the frame and the second position when the display setting is off is smaller than a distance between the frame and the second position when the display setting is on.

13. An eye-gaze information acquiring apparatus comprising at least one memory and at least one processor which function as:

a processing unit configured to display a frame, based on eye-gaze information of an observer observing display unit displaying an image and a determination operation by the observer; and a pointer display unit configured to display a pointer indicating an eye-gaze position of the observer on the display unit when a display setting is set to on, wherein when the observer moves an eye-gaze position from a first position to a second position and performs the determination operation at a timing when a prescribed period of time has elapsed after the eye-gaze position has moved to the second position, the prescribed period of time, which is necessary for a distance between the frame and the second position to become smaller than a prescribed value, is shorter when the display setting is off than when the display setting is on.

14. The eye-gaze information acquiring apparatus according to claim 12, wherein the frame is a focus detection frame.

15. The eye-gaze information acquiring apparatus according to claim 13, wherein when subject detection is set to be disabled, the determination operation causes a focus detection frame to be displayed based on an eye-gaze position of the observer.

16. An eye-gaze information acquiring apparatus comprising at least one memory and at least one processor which function as:

a processing unit configured to select a subject, based on eye-gaze information of an observer observing display unit displaying an image and a determination operation by the observer, and for performing display to that effect; and a pointer display unit configured to display a pointer indicating an eye-gaze position of the observer on the display unit when a display setting is set to on, wherein an amount of positional displacement between the eye-gaze position of the observer and the subject, which is allowed for a subject to be selected, is larger when the display setting is off than when the display setting is on.

17. The eye-gaze information acquiring apparatus according to claim 12, wherein when the amount of positional displacement between the eye-gaze position of the observer and the subject exceeds an amount of positional displacement which is allowed for a subject to be selected, a focus detection frame is displayed at an eye-gaze position of the observer.

18. The eye-gaze information acquiring apparatus according to claim 1, further comprising:

an accepting unit configured to accept a determination operation by the observer; and a processing unit configured to perform processing, based on the second eye-gaze information obtained after a prescribed period of time from a time point where the determination operation has been accepted, wherein the prescribed period of time is longer when the display setting is off than when the display setting is on.

19. An imaging apparatus comprising at least one memory and at least one processor which function as:

a setting unit configured to set an operating mode from a plurality of operating modes including a first operating mode and a second operating mode;

an imaging unit configured to pick up an image:

a display unit configured to display the image;

a first acquiring unit configured to acquire first eye-gaze information of an observer observing the display unit; and a second acquiring unit configured to acquire second eye-gaze information, based on the first eye-gaze information, wherein the second acquiring unit acquires the second eye-gaze information using methods that differ from each other between when the set operating mode is the first operating mode and when the set operating mode is the second operating mode.

20. The imaging apparatus according to claim 19, wherein the first operating mode is a mode in which a pointer indicating an eye-gaze position of the observer is displayed on the display unit, and the second operating mode is a mode in which the pointer is not displayed on the display unit.

21. The imaging apparatus according to claim 19, wherein the second operating mode is a mode for imaging a high-speed subject, and the first operating mode is a mode other than the second operating mode.

22. The imaging apparatus according to claim 19, wherein the second acquiring unit calculates the second eye-gaze information using a plurality of pieces of the first eye-gaze information, and when the second operating mode is set, the second acquiring unit calculates the second eye-gaze information using a smaller number of pieces of the first eye-gaze information than when the first operating mode is set.

23. The imaging apparatus according to claim 19, wherein the second acquiring unit calculates the second eye-gaze information by subjecting a plurality of pieces of the first eye-gaze information to weighted-averaging, and when the second operating mode is set, the second acquiring unit increases a weight with respect to the first eye-gaze information which is temporally close, as compared to when the first operating mode is set.

24. The imaging apparatus according to claim 19, wherein when the second operating mode is set, the second acquiring unit acquires the second eye-gaze information so that a temporal change of the second eye-gaze information is smoother than when the first operating mode is set.

25. An eye-gaze information acquiring method performed by an eye-gaze information acquiring apparatus, the method comprising the steps of:

acquiring first eye-gaze information of an observer who observes a display unit configured to display an image;

displaying a pointer indicating an eye-gaze position of the observer on the display unit when a display setting is set to on; and acquiring second eye-gaze information, based on the first eye-gaze information, wherein in the step of acquiring second eye-gaze information, the second eye-gaze information is acquired by a different method depending on the display setting of the pointer.

26. A non-transitory computer-readable storage medium storing a program which causes a computer to function as the respective units of the eye-gaze information acquiring apparatus according to claim 1.

27. A non-transitory computer-readable storage medium storing a program which causes a computer to execute the respective steps of the eye-gaze information acquiring method according to claim 25.

* * * * *